(12) United States Patent
Ellsworth

(10) Patent No.: US 10,687,522 B2
(45) Date of Patent: *Jun. 23, 2020

(54) SYSTEM FOR BALANCING AND TILT BIASING A SELF-LEVELING CROP SPRAYING APPARATUS

(71) Applicant: Mark S. Ellsworth, Tempe, AZ (US)

(72) Inventor: Mark S. Ellsworth, Tempe, AZ (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/733,914

(22) Filed: Jun. 8, 2015

(65) Prior Publication Data

US 2015/0264914 A1 Sep. 24, 2015

Related U.S. Application Data

(63) Continuation-in-part of application No. 11/733,703, filed on Apr. 10, 2007, now Pat. No. 9,049,854.

(51) Int. Cl.
*A01M 7/00* (2006.01)

(52) U.S. Cl.
CPC ........ *A01M 7/0053* (2013.01); *A01M 7/0057* (2013.01); *A01M 7/0075* (2013.01)

(58) Field of Classification Search
CPC .............. A01M 7/0053; A01M 7/0057; A01M 7/0071; A01M 7/0075
See application file for complete search history.

(56) References Cited

U.S. PATENT DOCUMENTS

| 3,731,879 | A | * | 5/1973 | Hoegen Dijkhof | ......................... A01M 7/0053 239/167 |
| 3,756,597 | A | * | 9/1973 | Monti | ................ A63B 21/0004 482/106 |
| 5,098,018 | A | * | 3/1992 | Hadar | ................ A01M 7/0014 180/89.13 |
| 9,049,854 | B2 | * | 6/2015 | Ellsworth | ........... A01M 7/0053 |

* cited by examiner

*Primary Examiner* — Christopher S Kim
(74) *Attorney, Agent, or Firm* — Schmeiser, Olsen & Watts LLP

(57) ABSTRACT

A crop spraying vehicle includes a mast arm having a mast arm sleeve slidingly engaged with it. A crop spraying apparatus is coupled to the mast arm sleeve with a pendulum arm. The engagement between the mast arm and mast arm sleeve restricts and allows the transverse and longitudinal rotation, respectively, of the crop spraying apparatus. The crop spraying apparatus includes a trim system, which is adjustable to adjust the rotation of the crop spraying apparatus.

2 Claims, 25 Drawing Sheets

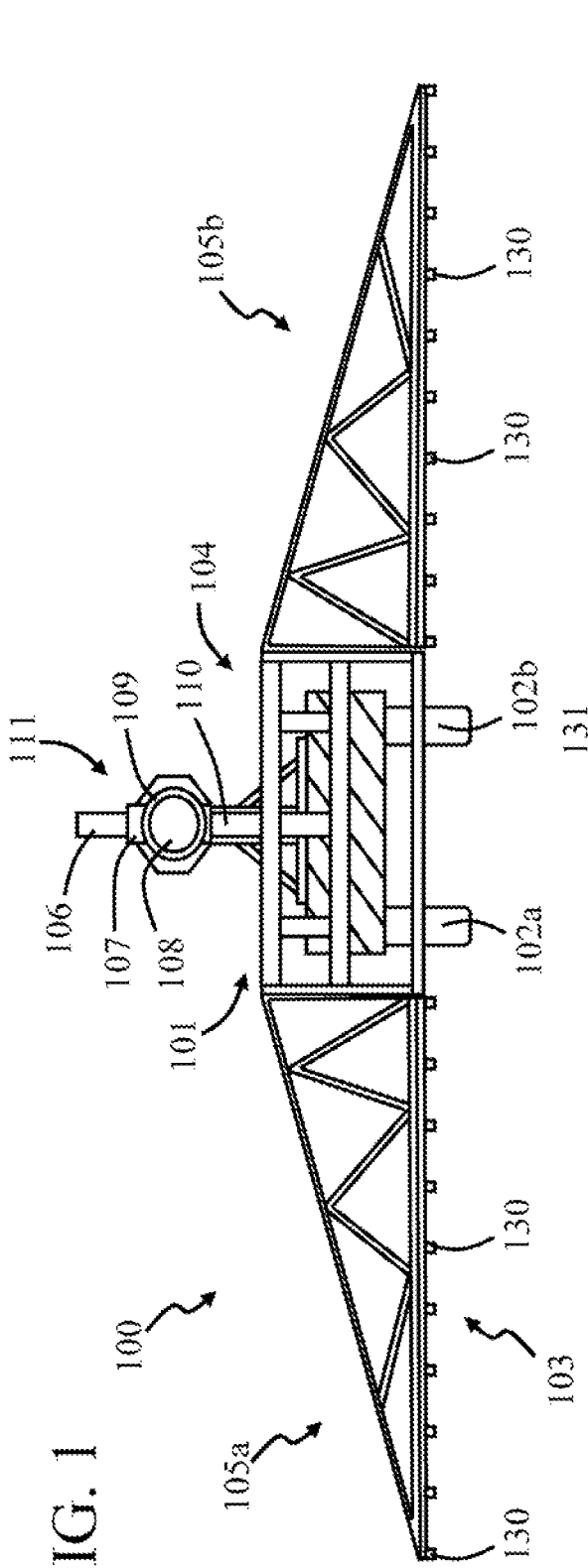
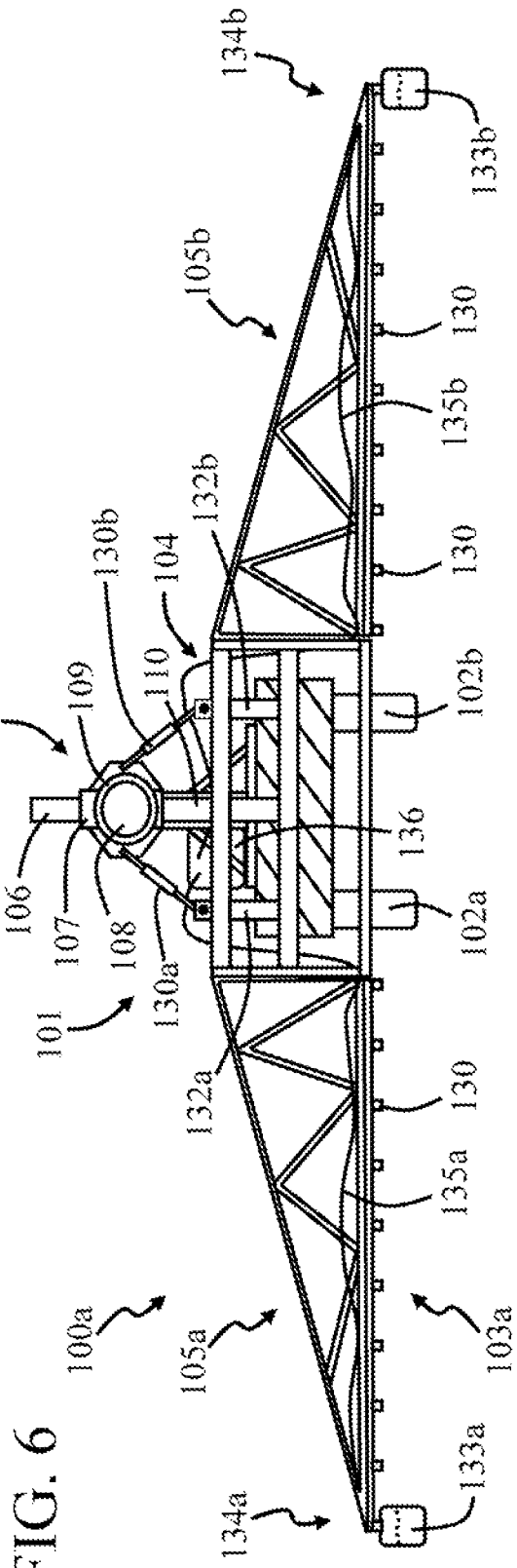

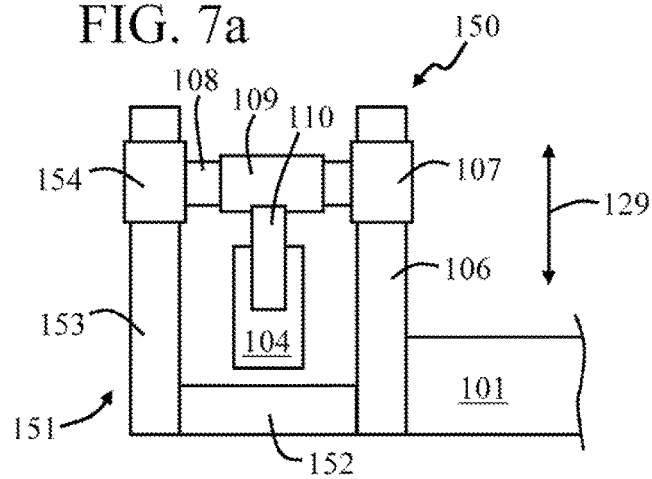
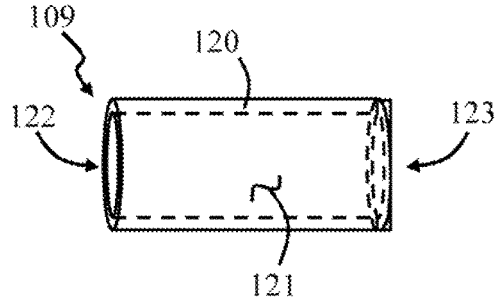
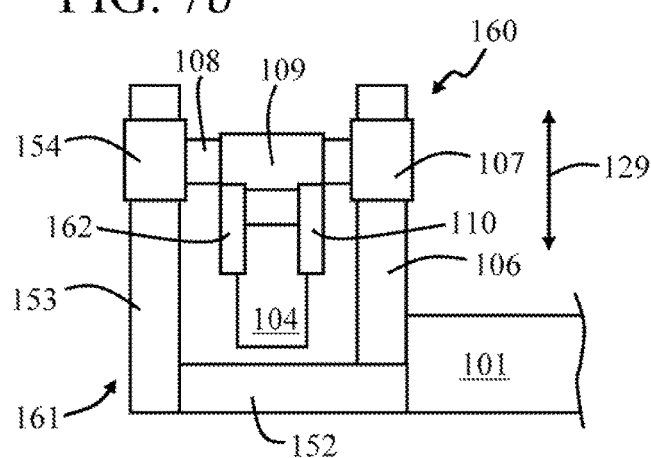
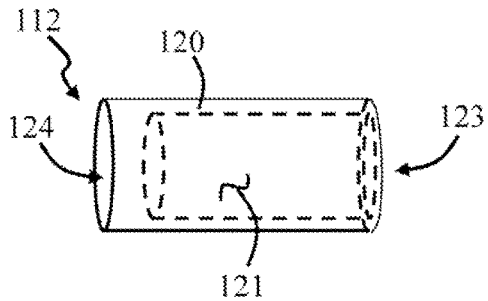
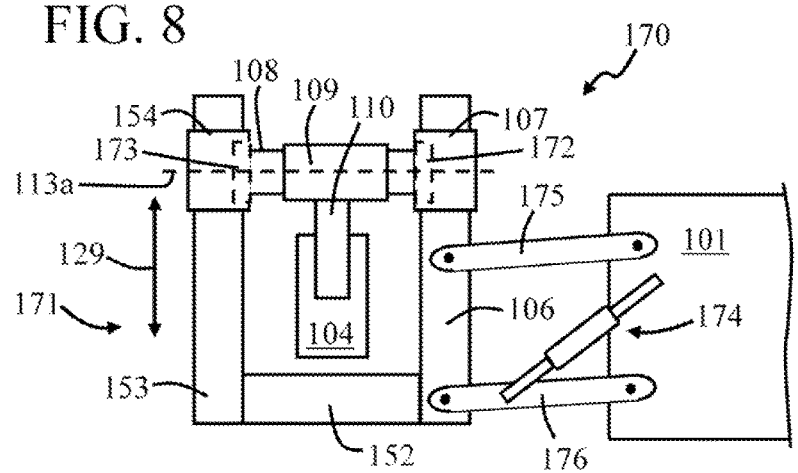

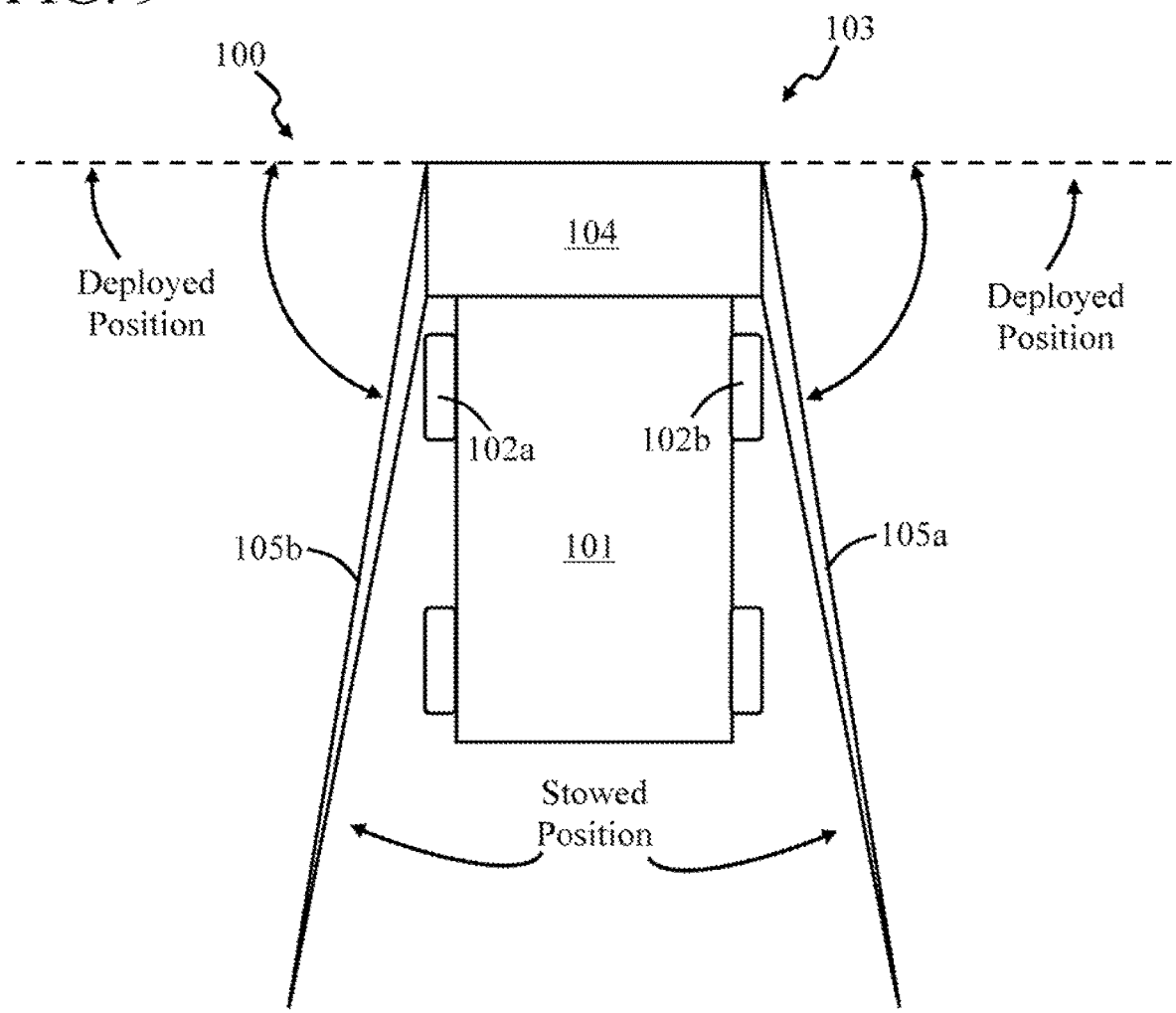

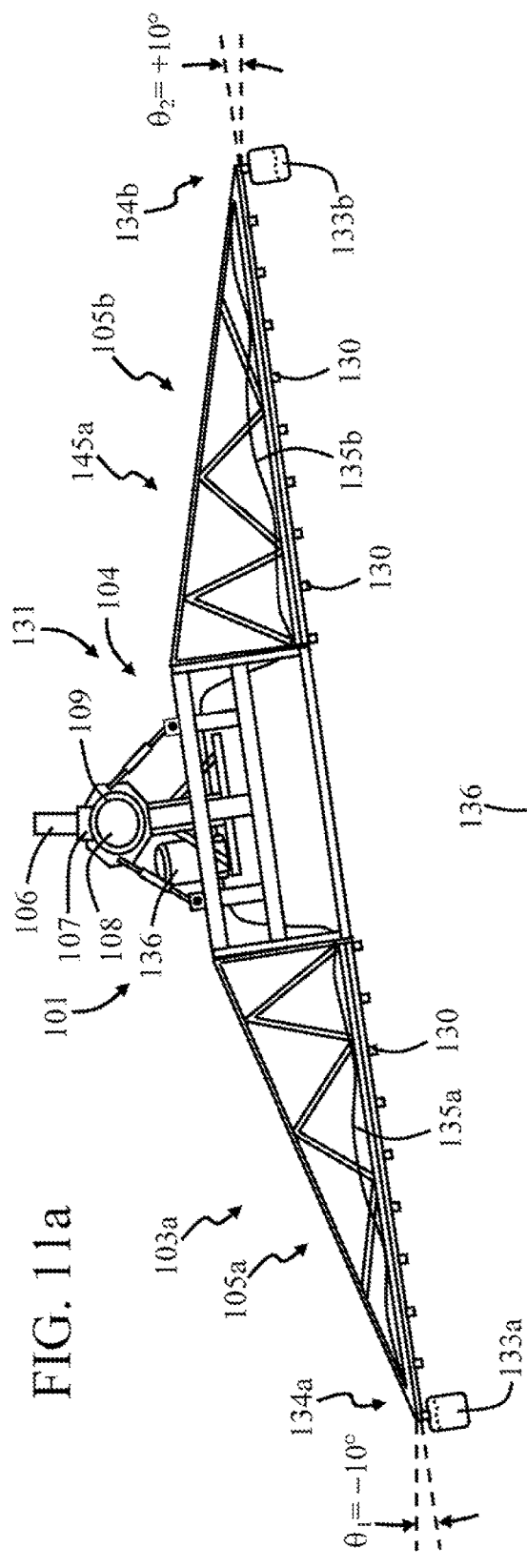
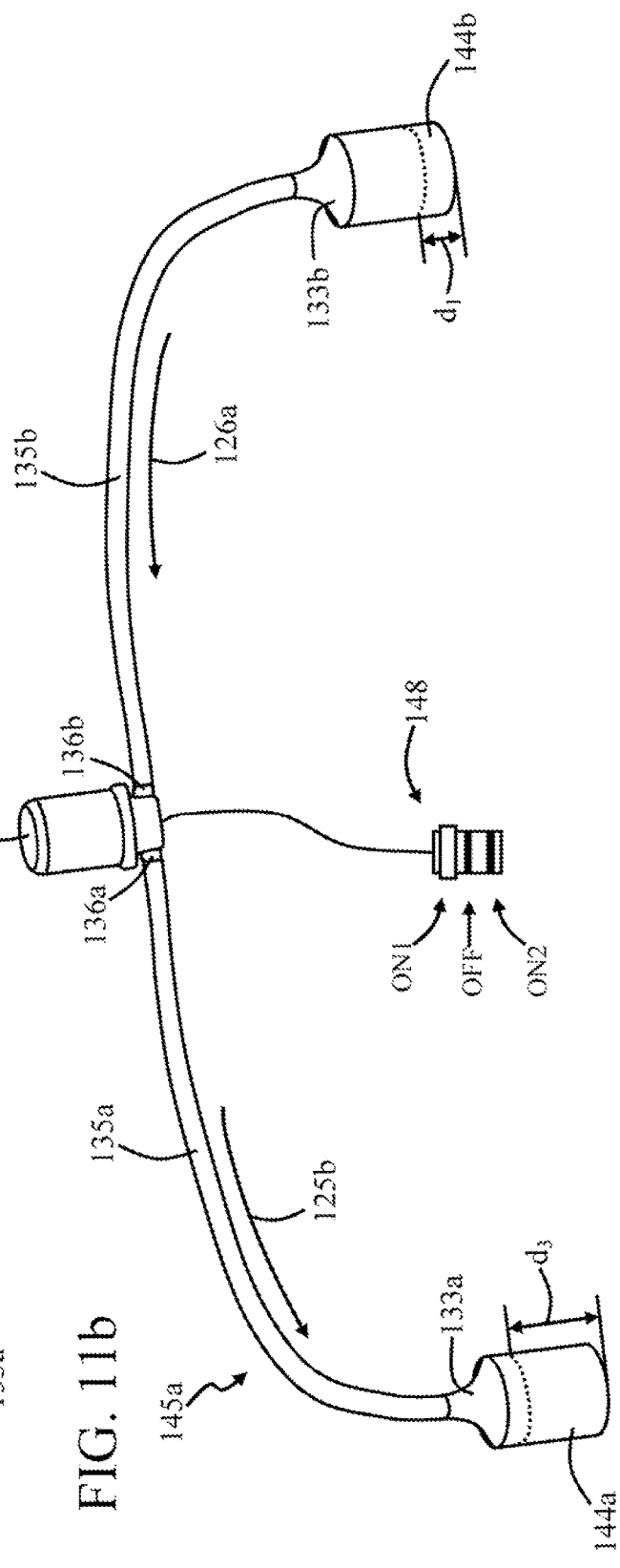

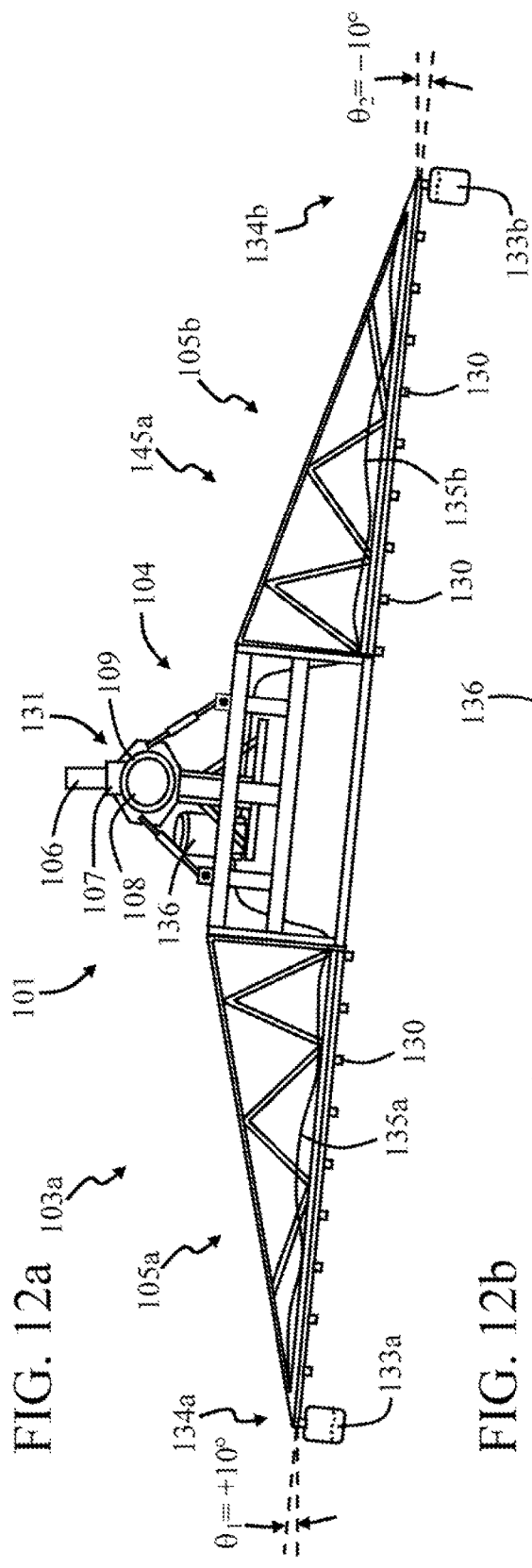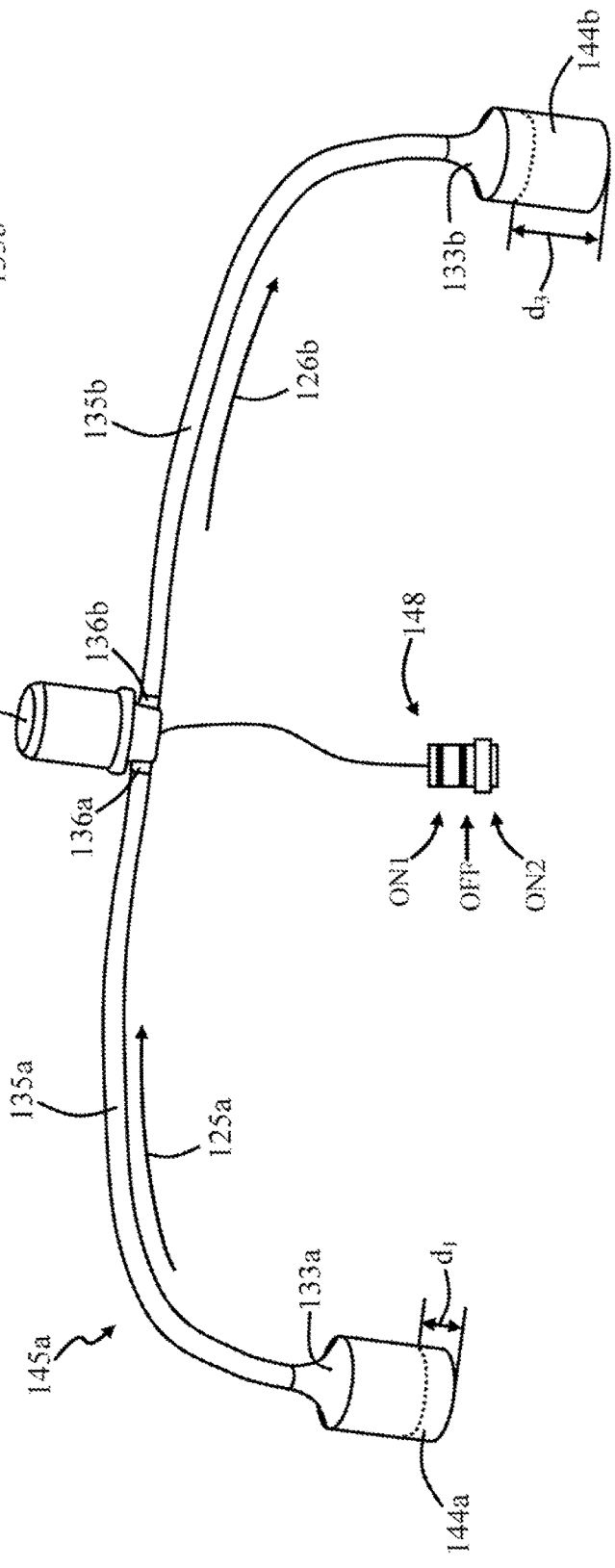

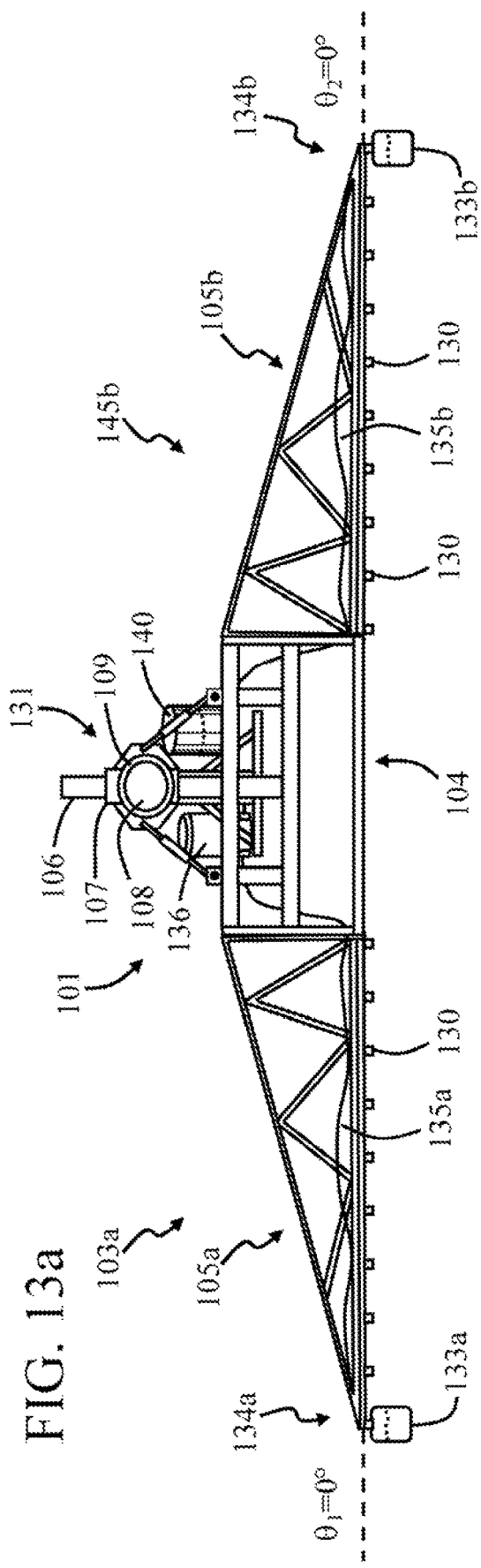

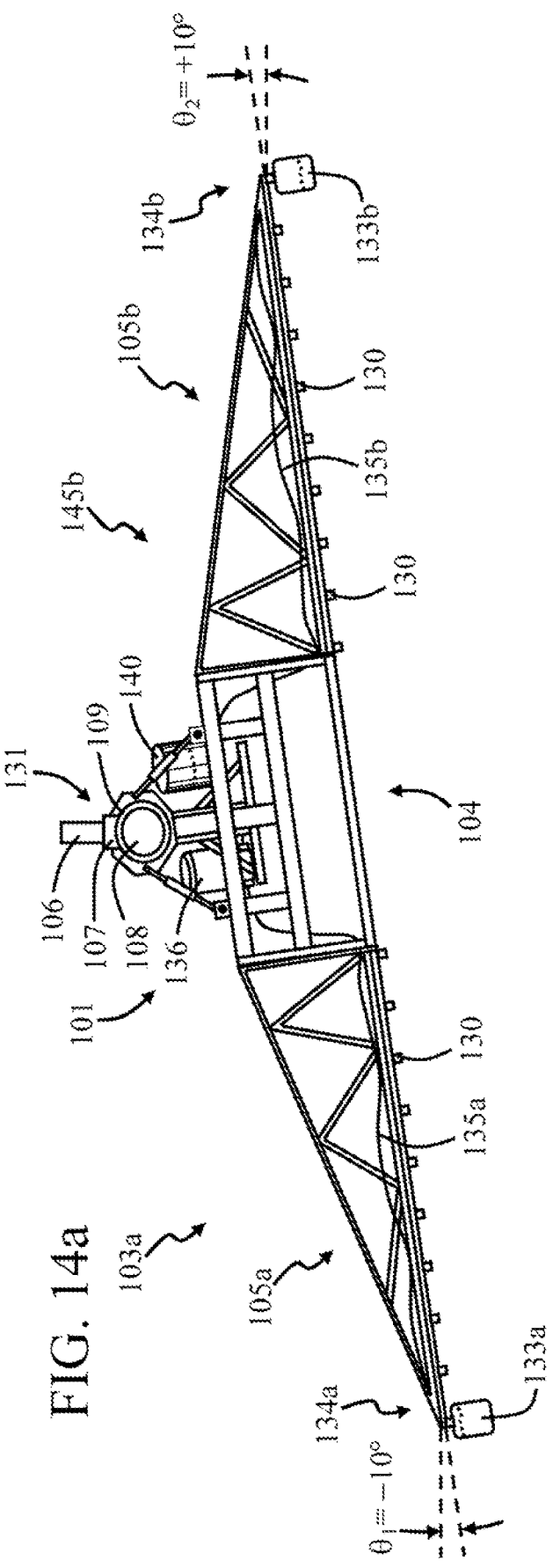

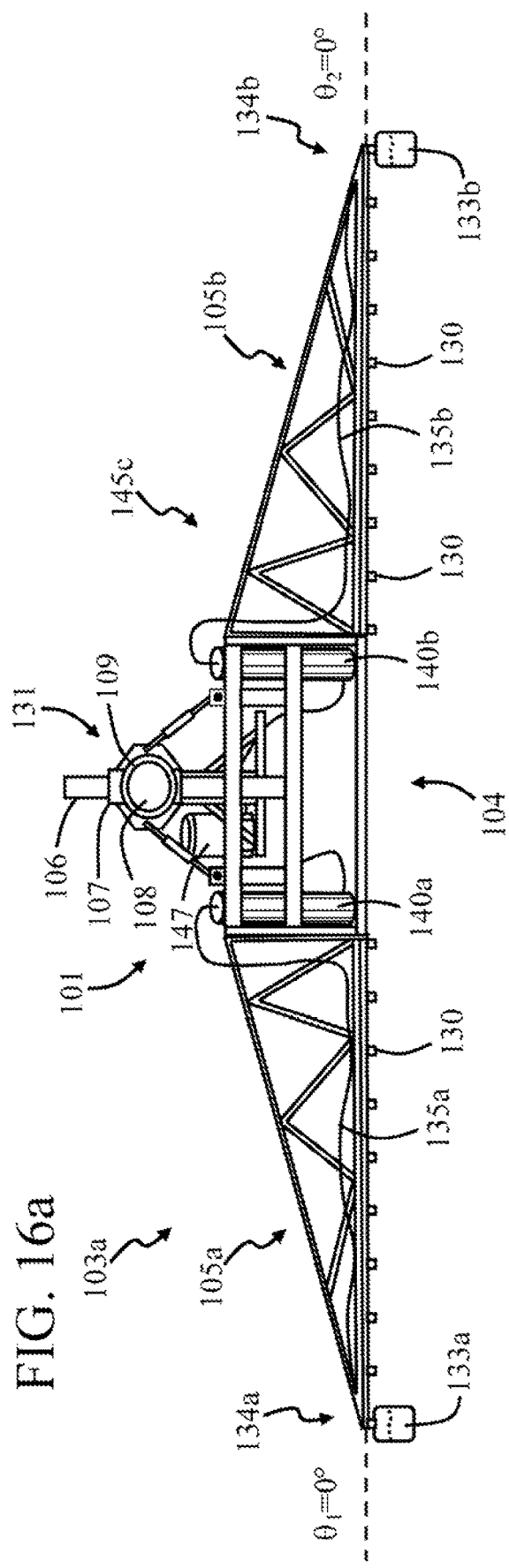

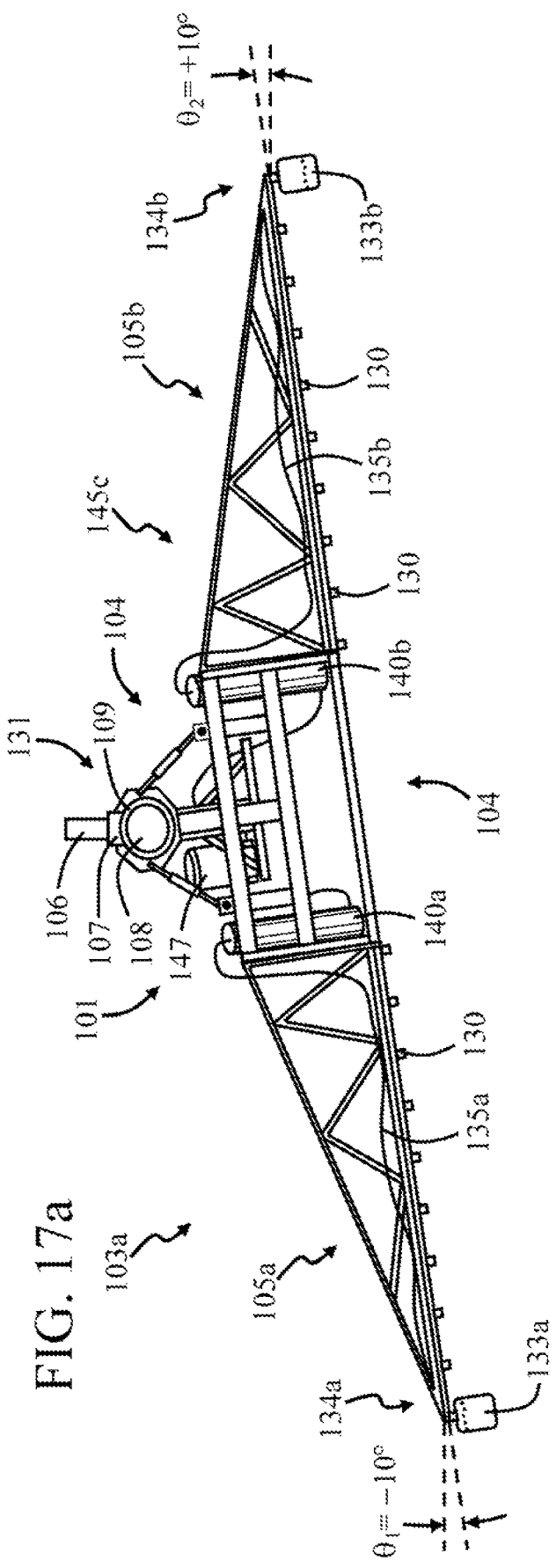

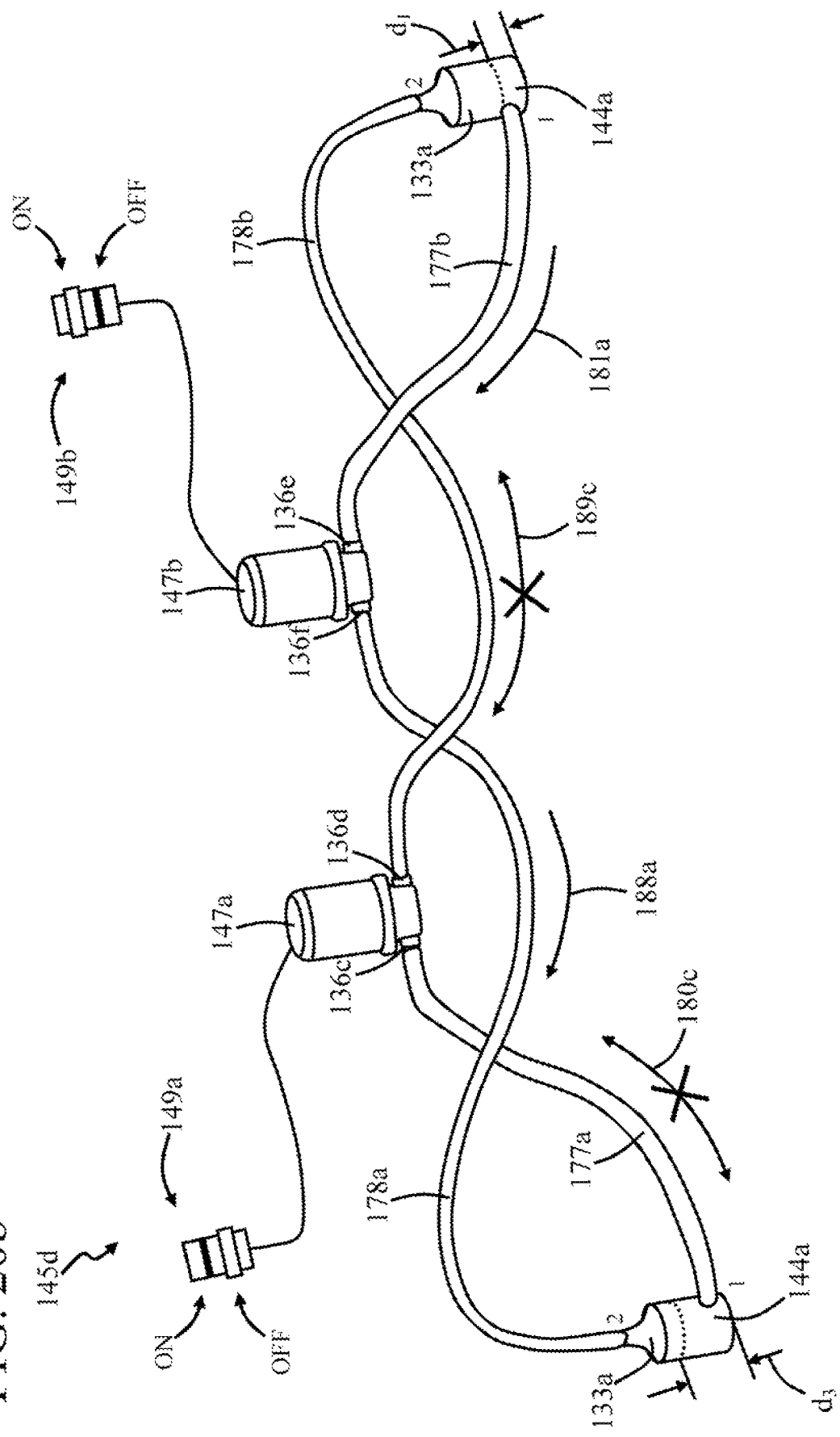

SYSTEM FOR BALANCING AND TILT BIASING A SELF-LEVELING CROP SPRAYING APPARATUS

CROSS-REFERENCE TO RELATED APPLICATIONS

This application is a continuation-in-part of U.S. application Ser. No. 11/733,703, filed on Apr. 10, 2007 by the same inventor, the contents of which are incorporated by reference as though fully set forth herein.

U.S. application Ser. No. 11/733,703 is a continuation in part of U.S. application Ser. No. 10/290,567, filed on Nov. 7, 2002 by the same inventor, the contents of which are incorporated by reference as though fully set forth herein.

BACKGROUND OF THE INVENTION

Field of the Invention

This invention relates generally to a crop spraying vehicle having outwardly extending booms.

Description of the Related Art

There are many different types of agricultural vehicles used to spray a field of crops. The spray generally includes a chemical which protects the crops from pests, fungi and/or weeds. Some of these agricultural vehicles, such as those disclosed in U.S. Pat. No. 6,131,821 to Nejsum and U.S. Pat. No. 6,234,407 to Knight, include a boom extending outwardly from both of its sides. The boom is used to carry nozzles connected to a tank of chemicals through piping. The chemicals are applied to the crops by flowing them from the tank, through the piping and spraying them out the nozzles over a spray area.

Examples of other crop spraying vehicles include those disclosed in U.S. Pat. No. 2,738,226 to Bals, U.S. Pat. No. 3,371,879 to Dijkhof, U.S. Pat. No. 4,200,255 to Schmidt, et al., U.S. Pat. No. 4,221,353 to Kuhn, et al., U.S. Pat. No. 4,561,591 to Ballu, U.S. Pat. No. 4,650,117 to Dudley, U.S. Pat. No. 4,834,249 to Dahl, U.S. Pat. No. 4,880,160 to Patterson, et al., U.S. Pat. No. 5,000,385 to Trusty, et al., U.S. Pat. No. 6,131,821 to Nejsum and U.S. Pat. No. 6,234,407 to Knight, et al., U.S. Design Pat. No. D344,737 appears to show a prime mover capable of carrying a crop spraying apparatus. Another example of a crop spraying vehicle is the SPRACOUPE, which is manufactured by AGCO Corporation.

The spray area can be increased by increasing the length of the booms and by increasing the number of nozzles spaced along their length. It is desirable to increase the spray area so that the field can be sprayed more efficiently. The field is sprayed more efficiently as the spray area is increased because the vehicle requires a fewer number of passes to cover it with chemicals.

BRIEF SUMMARY OF THE INVENTION

The present invention employs a crop spraying vehicle which includes a mast arm having a mast arm sleeve slidingly engaged with it. The engagement between the mast arm and mast arm sleeve restricts and allows the transverse and longitudinal rotation, respectively, of a crop spraying apparatus coupled to the mast arm. In some embodiments, the crop spraying apparatus includes outwardly extending booms which carry trim weight containers. The weight carried by the trim weight containers is adjustable to adjust the longitudinal rotation of the crop spraying apparatus so the booms are balanced. The trim weight containers can also be used to tilt bias the booms, which is useful when spraying on a tilted surface, such as a hill side, while maintaining a self-leveling capability of the crop spraying apparatus.

These and other features, aspects, and advantages of the present invention will become better understood with reference to the following drawings and description.

BRIEF DESCRIPTION OF THE DRAWINGS

It should be noted that like reference characters are used throughout the several views of the drawings.

FIG. 1 is a rear view of a crop spraying vehicle with a pendulum apparatus which carries a crop spraying apparatus.

FIG. 4a is a perspective view of a mast arm sleeve included with the pendulum apparatus of FIG. 1.

FIG. 4b is a perspective view of another embodiment of a mast arm sleeve which can be used with the pendulum apparatus of FIG. 1.

FIG. 6 is a rear view of a crop spraying vehicle with another embodiment of a pendulum and crop spraying apparatus.

FIG. 7a is a partial side view of a crop spraying vehicle which includes a dual-mast pendulum apparatus.

FIG. 7b is a partial side view of a crop spraying vehicle which includes a dual-mast pendulum apparatus having dual pendulum arms.

FIG. 8 is a partial side view of a crop spraying vehicle having a dual-mast pendulum apparatus coupled to a chassis with lift arms.

FIG. 9 is a top view of the crop spraying vehicle of FIG. 1 in a stowed and deployed condition.

FIG. 10b is a perspective view of the first trim system of FIG. 10a.

FIG. 11a is a rear view of the crop spraying apparatus of FIG. 10a in a first tilted condition.

FIG. 11b is a perspective view of the first trim system of FIG. 11a in the first tilted condition.

FIG. 12a is a rear view of the crop spraying apparatus of FIG. 10a in a second tilted condition.

FIG. 12b is a perspective view of the first trim system of FIG. 12a in the second tilted condition.

FIG. 13a is a rear view of the crop spraying apparatus of FIG. 6, which includes a second trim system.

FIG. 13b is a perspective view of the second trim system of FIG. 13a.

FIG. 14a is a rear view of the crop spraying apparatus of FIG. 13a in the first tilted condition.

FIG. 16a is a rear view of the crop spraying apparatus of FIG. 6, which includes a third trim system.

FIG. 16b is a perspective view of the third trim system of FIG. 16a.

FIG. 17a is a rear view of the crop spraying apparatus of FIG. 16a in the first tilted condition.

FIG. 19b is a perspective view of the fourth trim system of FIG. 19a.

FIG. 20b is a perspective view of the fourth trim system of FIG. 20a in the first tilted condition.

DETAILED DESCRIPTION OF THE INVENTION

Figure 2:
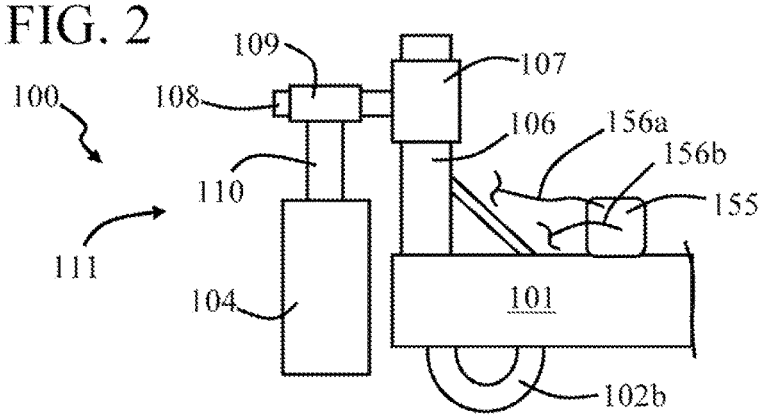
FIG. 2 is a partial side view of the crop spraying vehicle of FIG. 1.

FIG. 1 is a rear view of a crop spraying vehicle 100. In this embodiment, the vehicle 100 includes a chassis 101 carried by rear wheels 102a and 102b, and a crop spraying apparatus 103 coupled to the chassis 101 with a pendulum apparatus 111. It should be noted that the crop spraying apparatus disclosed herein are sometimes referred to as crop sprayers. It should also be noted that the pendulum apparatus 111, as well as the crop spraying apparatus 103, can include many different materials, such as metal, composites, plastic and/or wood. The chassis 101 is generally that of an agricultural tractor, which are made by many different manufactures, such as John Deere. These agricultural tractors can be of many different types, such as utility, row-crop, and four wheel drive tractors, among others. It should be noted, however, that the chassis 101 can be a structural element that allows attachment and detachment of the crop spraying apparatus 103 to the carrying vehicle 100.

In this embodiment, the crop spraying apparatus 103 includes a center support section 104 coupled with the pendulum apparatus 111. The booms 105a and 105b are attached to the center support section 104 and extend outwardly therefrom and away from the pendulum apparatus 111. The booms 105a and 105b are repeatably moveable between deployed and stowed positions, as shown in FIG. 9. It should be noted that the booms 105a and 105b are shown in the deployed position in FIG. 1. The booms 105a and 105b carry fluid lines 156a and 156b (FIG. 2) connected between the spray nozzles 130 and a chemical container 155 for holding chemicals. In operation, the chemicals flow from the tank and through the fluid lines 156a and 156b, and are sprayed out the spray nozzles 130.

The spray nozzles 130 are carried by and distributed along the booms 105a and 105b and spray the chemicals downwardly and away from the crop spraying apparatus 103. It is desirable to have the booms 105a and 105b extend further away from the chassis 101 so that more the spray nozzles 130 can be carried by the booms 105a and 105b and the sprayers can be distributed over a larger distance away from the center support section 104. In this way, the crop spraying vehicle 100 has a larger spray area so that a field can be sprayed more efficiently.

In this embodiment, the pendulum apparatus 111 is coupled to center support section 104 with a mast arm and mast arm sleeve. The mast arm sleeve is engaged with the mast arm so that the crop spraying apparatus 103 is allowed to roll. In this way, the crop spraying apparatus 103 is self-leveling and the booms 105a and 105b remain balanced.

Figure 3:
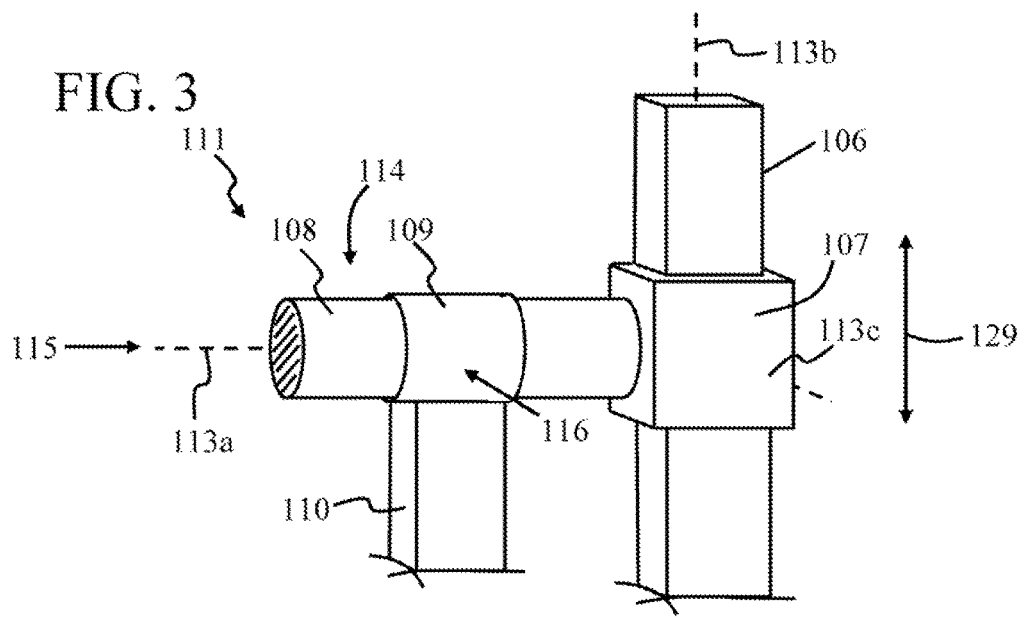
FIG. 3 is a close-up perspective view of the pendulum apparatus included with the crop spraying vehicle of FIG. 1.

FIG. 2 is a partial side view of the crop spraying vehicle 100 and FIG. 3 is a perspective view of the pendulum apparatus 111. In this embodiment, the crop spraying vehicle 100 includes the chemical container 155, which is carried by the chassis 101, wherein the chemical container is in fluid communication with the nozzles 130 (FIG. 1) through fluid lines 155a and 155b. In this embodiment, the pendulum apparatus 111 includes a mast 106 attached to and extending upwardly from the chassis 101. If should be noted that the mast 106 can be attached to the chassis 101 in many different ways, such as with bolts and/or welding. Here, the mast 106 extends upwardly from an upwardly facing surface of the chassis 101, although it can be attached to other surfaces in other examples. For example, a side surface or a slanted surface of the chassis 101 can be used. While the pendulum apparatus 111 includes a single mast, if can include more than one mast in other embodiments, a few of which will be discussed below with FIGS. 7a, 7b and 8.

In this embodiment, a mast arm 108 is slidingly engaged with the mast 106, and a mast arm 108 is connected, to the mast sleeve 107 so it extends outwardly therefrom and away from the chassis 101. In this embodiment, a mast arm sleeve 109 is slidingly engaged with the mast arm 108. Further, a pendulum arm 110 is connected to the mast arm sleeve 109 so it extends downwardly therefrom where it is connected to the center support section 104. In this way, the center support section 104 is coupled to the mast arm 108 through the mast arm sleeve 109 and center support section 104 is coupled to the chassis 101 with the pendulum apparatus 111.

As mentioned above, the mast sleeve 107 is slidingly engaged with the mast 106 so it is moveable in a direction 129. When the mast sleeve 107 moves upwardly along the mast 106 away from the chassis 101, the mast arm 108 also moves upwardly. Further, the crop spraying apparatus 103 is moved upwardly away from the ground (not shown) in response to the upward movement of the mast arm 108. When the mast sleeve 107 moves downwardly along the mast 106 towards the chassis 101, the mast arm 108 also moves downwardly. Further, the crop spraying apparatus 103 is moved downwardly towards the ground (not shown) in response to the downward movement of the mast arm 108.

It should be noted that the components included in the pendulum apparatus 111 can have many different shapes. In this embodiment the mast arm 108 and mast arm sleeve 109 are cylindrical in shape, and the mast arm sleeve 109 includes a central opening shaped and dimensioned for slidingly engaging the mast arm 108. Further, the mast 106 is rectangular in shape and the mast sleeve 107 is square in shape with a central opening shaped and dimensioned for slidingly engaging the mast 106. The shape of the mast arm sleeve 109 will be discussed in more detail presently.

FIG. 4a is a perspective view of the mast arm sleeve 109. In this embodiment, the mast arm sleeve 109 includes a sleeve body 120 having a channel 121 extending therethrough between opposed openings 122 and 123. The channel 121 and openings 122 and 123 are shaped and dimensioned so that the mast arm 108 can extend through them and the sleeve body 120. In this way, the mast arm sleeve 109 slidingly engages the mast arm 108. It should be noted that the mast arm sleeve 109 can have many other configurations, one of which will be discussed presently.

FIG. 4b shows another embodiment of a mast arm sleeve, denoted as mast arm sleeve 112. In this embodiment, the mast arm sleeve 112 includes the sleeve body 120 with the channel 121 extending between the opening 123 and a sidewall 124. Here, the channel 121 and opening 123 are shaped and dimensioned so that the mast arm 108 can extend through them and the sleeve body 120 so it engages the sidewall 124. In this way, the mast arm sleeve 112 slidingly engages the mast arm 108. It should be noted that, in these embodiments, the mast arm sleeves 109 and 112 are cylindrical in shape, but they can have other shapes in other examples, as mentioned above. However, their shape is generally chosen to match the shape of the mast arm 108 to facilitate them being slidingly engaged together. It should also be noted that the mast arm sleeves 109 and 112 can include many different materials, but they generally include metal, such as steel.

Figure 5A:
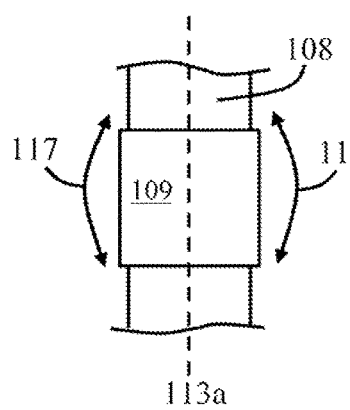
FIGS. 5a, 5b and 5c are top, front and side views of the mast arm sleeve of FIG. 4a slidingly engaged with a mast arm, and included with the pendulum apparatus of FIG. 1.
Figure 5B:
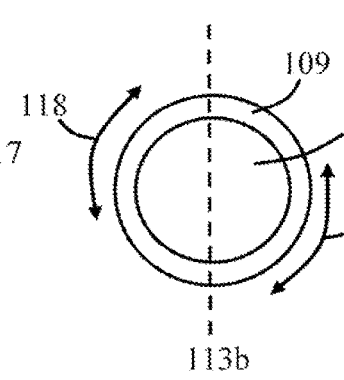
Figure 5C:
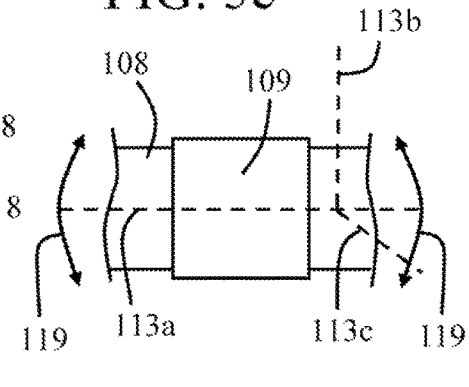

FIGS. 5a, 5b and 5c are top, front and side views, respectively, looking in directions 114, 115 and 116, respectively, of FIG. 3, showing the mast arm sleeve 109 slidingly engaged with the mast arm 108. As will be discussed in more detail presently, the engagement between the mast arm sleeve 109 and mast arm 108 restricts and allows the transverse and longitudinal rotation, respectively, of the center support section 104. In this way, the transverse and longitudinal rotation of the crop spraying apparatus 103 is also restricted and allowed, respectively, by the engagement between the mast arm sleeve 109 and mast arm 108.

It should be noted that the longitudinal rotation, of the crop spraying apparatus 103 corresponds to its roll and the transverse rotation of the crop spraying apparatus 103 corresponds to its pitch and yaw. Hence, the crop spraying apparatus 103 is coupled with the mast arm 108 through the mast arm sleeve 109 so its roll movement is allowed, but its pitch and yaw movement is restricted. The roll is the rotation about an axis 113a of the mast arm 108 (FIG. 3) and is indicated by rotation arrows 118 (FIG. 5b). The yaw is the rotation about an axis 113b (FIG. 3) of the mast 106 and is indicated by rotation arrows 117 (FIG. 5a). The pitch is the rotation about an axis 113c (FIG. 3) and is indicated by rotation arrows 119 (FIG. 5c).

In this embodiment, when the center support section 104 rotates in the direction of the rotation arrows 117 and/or 119 (FIGS. 5a and 5c), the mast arm sleeve 109 engages the mast arm 108 so this rotational movement is restricted. Hence, the mast arm sleeve 109 engages the mast arm 108 in response to being transversely rotated and this restricts the transverse rotation of the crop spraying apparatus 103. In this way, the yaw and pitch of the crop spraying apparatus 103 is restricted by the engagement between the mast arm sleeve 109 and mast arm 108.

Further, in this embodiment, when the crop spraying apparatus 103 rotates in the direction of the rotation arrows 118 (FIG. 5b), the mast arm sleeve 109 rotates about the mast arm 108. Hence, the mast arm sleeve 109 is allowed to rotate relative to the mast arm 108 in response to being longitudinally rotated and this allows the longitudinal rotation of the crop spraying apparatus 103. In this way, the roll of the crop spraying apparatus 103 is allowed by the engagement between the mast arm sleeve 109 and mast arm 108 and the crop spraying apparatus 103 can self-level.

FIG. 6 is a rear view of another embodiment of a crop spraying vehicle, which is denoted as a crop spraying vehicle 100a. In this embodiment, the crop spraying vehicle 100a includes the crop spraying apparatus 103a coupled with the chassis 101 with a pendulum apparatus 131. The crop spraying apparatus 103a includes the crop spraying apparatus 103 with the booms 105a and 105b connected to the center support section 104, as described above.

In this embodiment, the pendulum apparatus 131 includes the pendulum apparatus 111 and, in this embodiment, it further includes hydraulic cylinders 130a and 130b connected between the mast sleeve 107 and center support section 104. The hydraulic cylinders 130a and 130b are in fluid communication with a source of hydraulic fluid (not shown). It should be noted that the hydraulic cylinders 130a and 130b can be positioned at many different locations, but they are generally connected to the center support section 104 and the mast sleeve 107. In this way, the hydraulic cylinders 130a and 130b operate as locking mechanisms to restrict the movement of the center support section 104 relative to the mast sleeve 107. In this embodiment, the hydraulic cylinders 130a and 130b are connected between the beams 132a and 132b, respectively, of the center support section 104 and opposed sides of the mast sleeve 107. It should be noted that the hydraulic cylinders 130a and 130b allow the operator to tilt the center support section 104 manually. Further, the hydraulic cylinders 130a and 130b allow the operator to tilt and lock the center support section 104 in a desired position. The center support section 104 is shown tilted in FIGS. 11a, 12a, 14a, 15a, 17a, and 18a. The center support section 104 is shown untilted in FIGS. 10a, 13a, and 16a. The hydraulic cylinders 130a and 130b allow the center support section 104 to be locked when the booms 105a and 105b are in the stowed position, further, the hydraulic cylinders 130a and 130b allow the center support section 104 to be locked when the booms 105a and 105b are in the deployed position.

It is useful to be able to restrict the movement of the center support section 104 in several different situations. For example, it is useful to restrict the movement of the center support section 104 when the operator is spraying and does not want self-leveling. It is also useful to restrict the movement of the center support section 104 when moving booms 105a and 105b between the deployed and stowed positions. It is useful to restrict the movement of the center support section 104 when it is desirable to spray with one boom in the deployed position and the other boom in the stowed position, it is useful to restrict the movement of the center support section 104 when turning the crop spraying vehicle 100a, such as at the end of the field or during other maneuvers. It is useful to restrict the movement of the center support section 104 when it is desirable to tilt the booms 105a and 105b to clear an obstacle. It is useful to restrict the movement of the center support section 104 when driving over furrows. It is useful to restrict the movement of the center support section 104 during transport, such as when driving on a road or hauling the crop spraying vehicle 100 with a tractor.

As mentioned above, the crop spraying apparatus 103a includes the crop spraying apparatus 103. In this embodiment, the crop spraying apparatus 103a also includes the trim weight containers 133a and 133b carried by the booms 105a and 105b, respectively. In this embodiment, the trim weight containers 133a and 133b are positioned at or near the distal ends 134a and 134b of the booms 105a and 105b, respectively. In this embodiment, the weights of the trim weight containers 133a and 133b are adjustable to adjust the roll of the crop spraying apparatus 103. This is useful to provide the booms 105a and 105b with a desired tilt bias, while maintaining self-leveling, such as when using the vehicle 100 to spray on a tilted surface like a hillside.

It should be noted that the trim weight containers 133a and 133b include containers for containing a trim weight material, such as rocks and/or metal. The rocks and metal can be manually positioned within and removed from, the trim weight containers to provide the trim weight containers 133a and 133b with a desired amount of weight. However, in this particular embodiment, the trim weight material includes a liquid, which can be of many different types, such as water. Hence, the trim weight containers 133a and 133b can be provided with a desired amount of weight by having them include a desired amount of trim weight material. Further, the trim weight containers 133a and 133b can be provided with a desired amount of weight by having them contain a desired amount of trim weight material. The weight of the trim weight containers 133a and 133b increases as the amount of trim weight material included therein increases. Further, the weight of the trim weight containers 133a and 133b decreases as the amount of trim weight material included therein decreases. It should also be noted that the trim weight containers 133a and 133b can have the same empty weight, which is the corresponding weight with no trim weight material included therein.

The weights of the trim weight containers 133a and 133b are adjustable by flowing a fluid into and out of the corresponding containers. Further, the weights contained by the trim weight containers 133a and 133b are adjustable by flowing the fluid into and out of the corresponding containers. The fluid can be flowed into and out of the trim weight containers 133a and 133b in many different ways, such as by manually placing the fluid therein. In this particular embodiment, however, a pump 136 is used to flow the fluid into and out of the trim weight containers 133a and 133b. The pump 136 is in fluid communication with the trim weight containers 133a and 133b through the fluid conduits 135a and 135b, respectively. The fluid conduits 135a and 135b extend from the pump 136 and along the booms 105a and 105b, respectively. The pump 136 can be of many different types, such as a water pump. Further, the fluid conduits 135a and 135b can be of many different types, such as rubber and/or plastic tubing.

In this embodiment, the pump 136 is carried by the chassis 101. However, in some embodiments, the pump 136 is carried by the crop spraying apparatus 103a, it is useful to have the pump 136 be carried by the crop spraying apparatus 103a so that the fluid conduits 135a and 135b can be shorter in length. As will be discussed in more detail below, the pump 136 includes a controller for controlling its operation. The controller is typically positioned so that it can be operated by the operator while driving the crop spraying vehicle 100a.

The pumps disclosed herein can be of many different types, such as a gear pump, a diaphragm pump, and a roller pump, among others. Some of these pumps, such as the gear pump, are bidirectional pumps. The bidirectional pump allows the flow of fluid in a first direction, in a first mode of operation, and a second direction, in a second mode of operation. The first and second directions are opposed directions. Others of these pumps are unidirectional pumps, which have one mode of operation that allows the flow of the fluid in the first direction and not the second direction. The bidirectional and unidirectional operation of the pumps disclosed herein will be discussed in more detail below. It is desirable to have a small pump so that the fluid lines are smaller, and the fluid will flow in response to a lower pressure. Pumps are provided by many different manufacturers, such as Pentair, Inc. of Garden Grove, Calif., which makes the SHURFLO pump.

When the pump 136 flows water into the trim weight containers 133a through the fluid conduit 135a and out of the trim weight container 133b through the fluid conduit 135b, the mast arm sleeve 109 rolls relative to the mast arm 108 so that the booms 105a and 105b move downwardly and upwardly, respectively. When the pump 136 flows water out of the trim weight containers 133a through the fluid conduit 135a and into the trim weight container 133b through the fluid conduit 135b, the mast arm sleeve 109 rolls relative to the mast arm 108 so that the booms 105a and 105b move upwardly and downwardly, respectively. In this way, the weights of the trim weight containers 133a and 133b are adjustable by flowing a fluid into and out of their corresponding containers. Further, the roll of the crop spraying apparatus 103a is controlled by flowing water into and out of the containers of the trim weight containers 133a and 133b.

FIG. 7a is a partial side view of a crop spraying vehicle 150 which includes a dual-mast pendulum apparatus 151, in this embodiment. In this embodiment, the dual mast pendulum apparatus 151 is carried by the chassis 101 and includes a cross-beam 152 which couples the mast 106 to a mast 153. The cross-beam 152 is attached between the lower portions of the masts 106 and 153, although the cross-beam 152 can also be attached to the chassis 101 if desired, as in FIG. 7b. It should be noted that, in some embodiments, a cross-beam can be positioned so it extends between the upper ends of the masts 106 and 153.

In this embodiment, the mast 106 is attached to and extends upwardly from a side surface of the chassis 101. It should be noted, however, that the mast 106 can be attached to an upwardly facing surface of the chassis 101 in other embodiments, with one being shown in FIG. 2, Further, in other embodiments, the mast 106 can be attached to the cross-beam 152 instead of the chassis 101. For example, in some embodiments, the cross-beam 152 is attached to the chassis 101 and carries the mast 106 so that the mast 106 is not directly attached to the chassis 101. An embodiment wherein the mast 106 and cross-beam 152 are not directly attached to the chassis 101 is shown in FIG. 8.

In this embodiment, the mast sleeve 107 is slidingly engaged with the mast 106 and a mast sleeve 154 is slidingly engaged with the mast 153. Here, the mast sleeve 154 is slidingly engaged with the mast 153 in the same manner that the mast sleeve 107 is slidingly engaged with the mast 106. In this way, the mast sleeves 107 and 154 are moveable relative to the masts 106 and 153, respectively, in the direction 129. The mast arm 108 has opposed ends connected to the mast sleeves 107 and 154 so it extends between the masts 106 and 153. In this embodiment, the mast arm sleeve 109 is slidingly engaged with the mast arm 108 so it is moveable between the mast sleeves 107 and 154, as well as the masts 106 and 153. In other embodiments, such as that discussed with FIG. 8 below, the mast arm sleeve 109 is fixedly attached to the mast arm 108. The pendulum arm 110 is coupled with the mast arm sleeve 109 and extends downwardly therefrom, where it is connected to the center support section 104.

As described in more detail above, the mast arm sleeve 109 is engaged with the mast arm 108 so that its roll movement is allowed, but its pitch and yaw movement is restricted. Hence, the engagement between the mast arm sleeve 109 and mast arm 108 restricts and allows the transverse and longitudinal rotation, respectively, of the center support section 104. In this way, the dual-mast pendulum apparatus 151 restricts and allows the transverse and longitudinal rotation, respectively, of the crop spraying apparatus 103.

The dual-mast pendulum apparatus 151 is sturdy because it includes the masts (i.e. masts 106 and 153) connected to opposed end of the mast arm 108 instead of one mast connected to an end of the arm 108, as in the pendulum apparatus 111. Hence, the mast arm 108 is able to counteract a larger torque applied to it by its engagement with the mast arm sleeve 109 in response to the transverse rotation of the crop spraying apparatus 103. By being able to counteract a larger torque, the pendulum apparatus 151 allows the booms 105*a* and 105*b* to extend further away from the chassis 101, which provides a larger spray area as discussed in more detail above. In this way, the chassis 101 can carry a larger boom.

FIG. 7*b* is a partial side view of a crop spraying vehicle 160 which includes a dual-mast pendulum apparatus 161. The dual-mast pendulum apparatus 161 is carried by chassis 101 and includes the dual-mast pendulum apparatus 151 as described with FIG. 7*a*. In this embodiment, the pendulum apparatus 161 further includes a pendulum arm 162 connected between the mast arm sleeve 109 and center support section 104. Hence, the pendulum apparatus 161 includes dual pendulum arms defined by the pendulum arms 110 and 162. Dual pendulum arms are useful because it allows the dual-mast pendulum apparatus 161 to carry a heavier crop spraying apparatus 103. For example, the crop spraying apparatus 103 can extend outwardly by a further distance since. This is useful because it provides the crop spraying vehicle 100 with a larger spray area.

In this embodiment, the pendulum arms 110 and 162 are parallel, but they can be at a non-zero angle relative to each other in other embodiments so they are not parallel. Further, the pendulum arms 110 and 162 are spaced apart from each other so that the torque applied to the mast arm 108 is distributed over a larger area of the mast arm 108. In this way, the dual-mast pendulum apparatus 161 can counteract a larger torque. Further, the weight of the crop spraying apparatus 103 is distributed over a larger area of the mast arm 108. In this way, the dual-mast pendulum apparatus 161 can support more weight. The torque is provided in many different ways, such as in response to the transverse rotation of the center support section 104 providing torque to the mast arm sleeve 109. The torque can also be provided in response to having the booms 105*a* and 105*b* in the stowed position.

It should be noted that in some embodiments, the dual pendulum arms of the pendulum apparatus 161 can be used with a pendulum apparatus having a single mast, such as the pendulum apparatus 111. A single mast pendulum apparatus with dual pendulum arms is generally sturdier than a pendulum apparatus with a single pendulum arm, and can counteract a larger torque and support a larger weight. It should also be noted that the pendulum apparatus 161 can be a part of the center support structure 104 and it can be separate from it.

In some embodiments, the mast arm sleeve 109 can extend all the way between the mast sleeves 107 and 154 instead of partially between them as shown in FIGS. 7*a* and 7*b*. As the length of the mast arm sleeve 109 increases, the torque and weight applied to the mast arm 108 by the crop spraying apparatus 103 is distributed over a larger area of the mast arm 108. In this way, the pendulum apparatus 161 can counteract a larger maximum torque and support a larger maximum weight. As the length of the mast arm sleeve 109 decreases, the torque and weight applied to the mast arm 108 by the crop spraying apparatus 103 is distributed over a smaller area of the mast arm 108. The maximum amount of torque and weight that the pendulum apparatus 161 can counteract is smaller if the torque and weight applied to the mast arm 108 by the crop spraying apparatus 103 is distributed over a smaller area of the mast arm 108. It is generally desirable to increase the maximum torque and weight that the pendulum apparatus 161 can support so that it is less likely to break.

FIG. 8 is a partial side view of a crop spraying vehicle 170 which includes a dual-mast pendulum apparatus 171, in this embodiment. The dual-mast pendulum apparatus 171 is coupled with the chassis 101 using lift arms and includes the dual-mast pendulum apparatus 151. In this embodiment, however, the mast sleeves 107 and 154 are fixedly attached with the masts 106 and 153, respectively, instead of slidingly engaged therewith as above. Further, the mast arm sleeve 109 is fixedly coupled to the mast arm 108 so that they rotate together in response to the roll of the center support section 104. It should be noted that the mast arm sleeve 109 and mast arm 108 can be separate pieces fixedly coupled together or they can be a single integral piece.

In this embodiment, the mast arm 108 is rotatably mounted between the mast sleeves 107 and 154 and the masts 106 and 153, so that it can rotate about the axis 113*a*. The mast arm 108 can be rotatably mounted in many different ways. In this embodiment, the mast sleeves 107 and 154 carry bearings 172 and 173, respectively, which engage the ends of the mast arm 108. The bearings 172 and 173 can be of many different types, such as roller bearings, and are carried by the mast sleeves 107 and 154, respectively, so that they face each other. In this way, the mast arm 108 is mounted for rotation.

In this embodiment, the dual-mast pendulum apparatus 171 is coupled with the chassis 101 with lift arms, so that the mast 106 and cross-beam 152 are not directly attached to the chassis 101. The lift arms are useful so that the pendulum apparatus 171 can be coupled to and decoupled from the chassis 101 in an easier manner. In this embodiment, the lift arms include upper and lower lift arms 175 and 176 and corresponding upper and lower lift arms (not shown) positioned at the other side of the chassis 101.

The lift arms 175 and 176 can be connected between the chassis 101 and pendulum apparatus 171 at many different locations. In this embodiment, the lift arm 175 extends between the chassis 101 and mast 106 near the cross beam 152 and lift arm 176 extends between the chassis 101 and mast 106 near the mast sleeve 107. It should be noted that the corresponding lift arms at the other side of the chassis 101 are connected between the pendulum apparatus 171 and chassis 101 at corresponding locations at the other side, but they are not shown for simplicity.

The dual-mast pendulum apparatus 171 is moveable in response to the extension and retraction of lifting cylinders connected to the lift arms. In this embodiment, the lifting cylinders include a lifting cylinder 174 connected between the chassis 101 and lower lift arm 175, and operates to rotate the arm 175 relative to the chassis 101. A corresponding lifting cylinder (not shown) is connected between the chassis 101 and the corresponding lower lift arm on the other side of the chassis 101, and operates to rotate it. When the lifting cylinders are extended and retracted, the lower lift arms are lowered and raised, respectively. In this way, the dual-mast pendulum apparatus 171 is moveable in the direction 129 in response to the extension and retraction of lifting cylinders.

It should be noted that the pendulum apparatuses 111, 151, and 161 can include separate mast arm sleeves and pendulum arms, or they can be a single integral piece. For example, the pendulum arms 110 and 162 of the pendulum apparatus 111 can be integral with the mast arm sleeve 109 or they can be separate pieces. It should also be noted that in some embodiments, the crop spraying vehicles 150, 160 and 170 can include the trim weights 134a and 134b and/or the hydraulic cylinders 130a and 130b, as shown in FIG. 6.

Figure 10A:
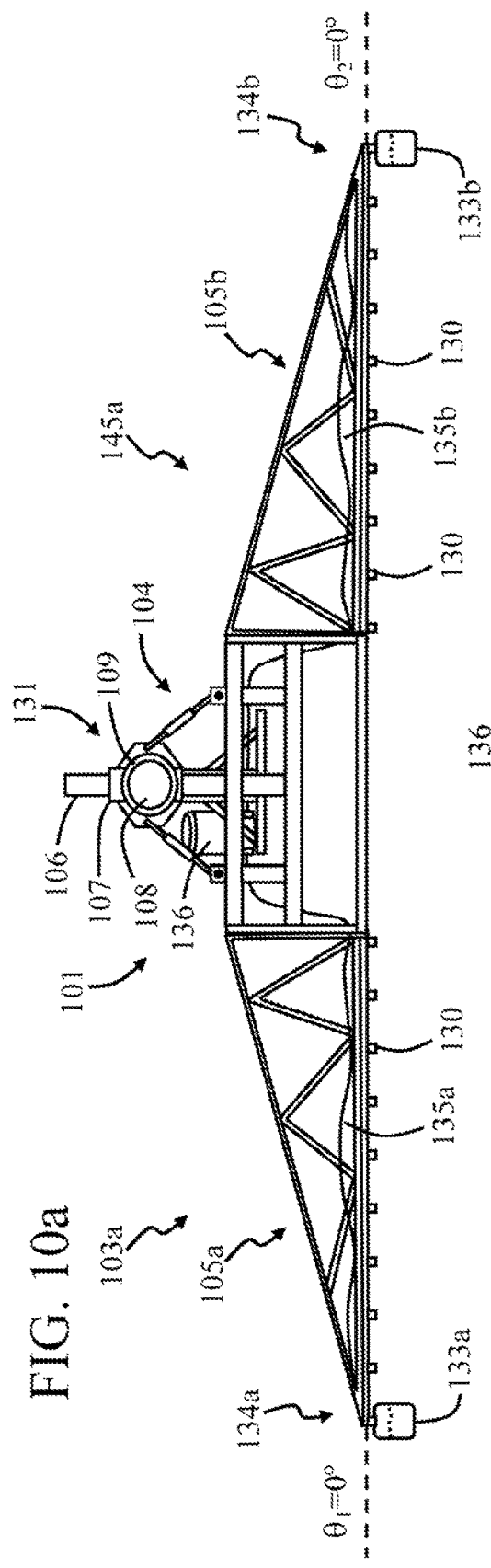
FIG. 10a is a rear view of the crop spraying apparatus of FIG. 6, which includes a first trim system.
Figure 10B:
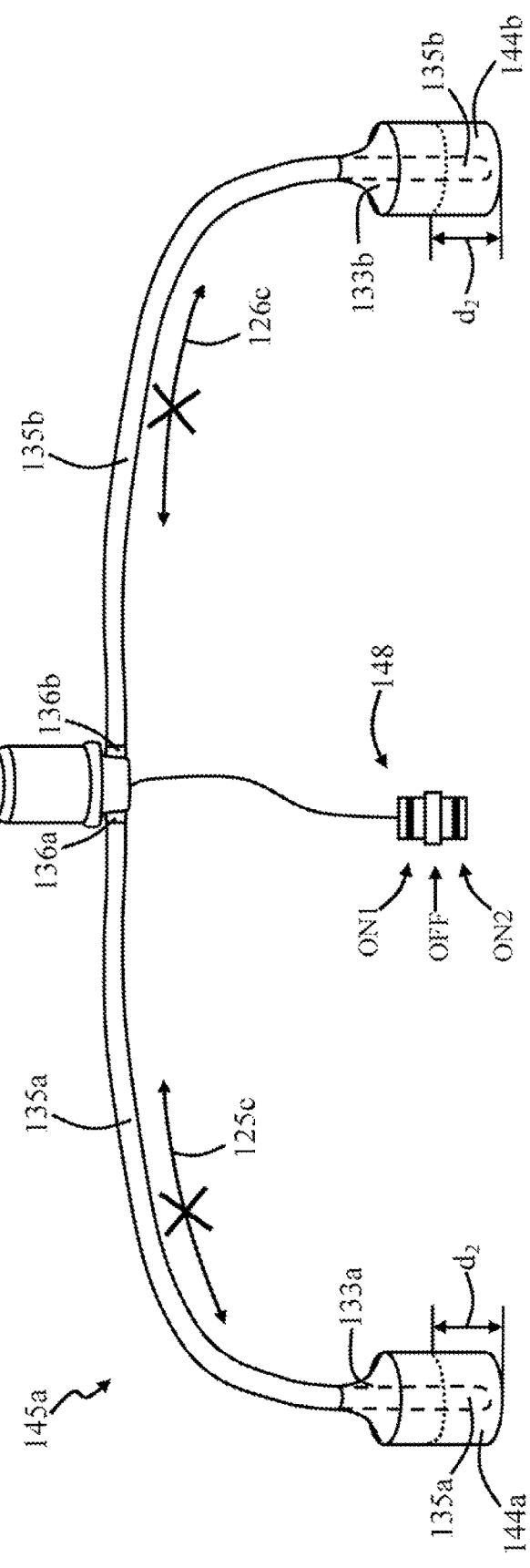

FIG. 10a is a rear view of the crop spraying apparatus 103a of FIG. 6, which includes a trim system 145a, and FIG. 10b is a perspective view of the trim system 145a of FIG. 10a. It should be noted that the crop spraying apparatus 103a is described in more detail above with FIG. 6. In this embodiment, the trim system 145a includes the pump 136, which includes ports 136a and 136b. The pump 136 includes a pump switch 148, which operates as a pump controller to control the operation of the pump 136. In this embodiment, the pump switch 148 is embodied as a three-way switch having three settings. In a first setting, the pump switch 148 is in an OFF position so that the pump 136 is in an off condition. When pump 136 is in the off condition, the ports 136a and 136b do not provide suction, and the ports 136a and 136b do not provide pressure. It should be noted that the pump switch 148 is shown in the OFF position in FIG. 10b. In a second setting, the pump switch 148 is in an ON1 position, so that the port 136b provides suction and the port 136a provides pressure, as will be discussed below with FIGS. 11a and 11b. In a third setting, the pump switch 148 is in an ON2 position, so that the port 136a provides suction and the port 136b provides pressure, as will be discussed below with FIGS. 12a and 12b. In this way, the pump 136 operates as a bidirectional pump.

In this embodiment, the trim system 145a includes the fluid conduits 135a and 135b, wherein one end of fluid conduit 135a is connected to the port 136a and one end of the fluid conduit 135b is connected to the port 136b. Further, the trim system 145a includes the trim weight containers 133a and 133b. The opposed end of the fluid conduit 135a extends through an opening of the trim weight container 133a, as shown in phantom in FIG. 10b. The opposed end of the fluid conduit 135b extends through an opening of the trim weight container 133b, as shown in phantom in FIG. 10b.

In this embodiment, the trim weight container 133a includes a fluid 144a, and the trim weight container 133b includes a fluid 144b. The fluids 144a and 144b can be of many different types, such as water. In FIG. 10b, the level of the fluid 144a of the trim weight container 133a is denoted as a distance $d_2$. Further, the level of the fluid 144b of the trim weight container 133b is denoted as the distance $d_2$. Hence, in FIG. 10b, the weights of the trim weight containers 133a and 133b are substantially the same so that the crop spraying apparatus 103a is level. As shown in FIG. 10a, the crop spraying apparatus 103a is level because the angle theta1 ($\theta_1$) of the boom 105a is equal to zero degrees (0°), and the angle theta2 ($\theta_2$) of the boom 105b is equal to zero degrees (0°). The angles theta1 and theta2 are equal to zero degrees when the crop spraying apparatus 103a is level. The crop spraying apparatus 103a is level when it is horizontal. It should be noted that, in some situations, the distance $d_2$ is driven to zero so that the trim weight containers 133a and 133b include substantially no fluid.

As mentioned above, the pump switch 148 is in the OFF position in FIGS. 10a and 10b so that the pump 136 is in the off condition. Hence, there is a restricted flow 125c of the fluid through the fluid conduit 135a, and a restricted flow 126c of the fluid through the fluid conduit 135b. In this way, the fluids 144a and 144b are restricted from flowing through the ports 136a and 136b of the pump 136. It should be noted that the fluids 144a and 144b can be moved between the trim weight containers 133a through the fluid conduits 135a and 135b, as will be discussed in more detail presently.

FIG. 11a is a rear view of the crop spraying vehicle 100a of FIG. 10a in a first tilted condition, and FIG. 11b is a perspective view of the trim system 145a of FIG. 11a in the first tilted condition. In operation, the pump switch 148 is in the ON1 position so that the pump 136 applies a suction to the port 136b and a pressure to the port 136a. In response, a portion of the fluid 144b flows in a flow direction 126a from the trim weight container 133b to the port 136b through the fluid conduit 135b. The portion of the fluid 144b flows through the pump 136 and to the fluid conduit 135a through the port 136a. The portion of the fluid 144b flows in a flow direction 125b through the fluid conduit 135a to the trim weight container 133a, wherein the portion of the fluid 144b is combined with the fluid 144a, and the crop spraying apparatus 103a rotates in response. The combining of the fluids 144a and 144b is indicated in FIG. 11b, wherein the level of the fluid 144a of the trim weight container 133a is denoted, as the distance $d_3$ and the level of the fluid 144b of the trim weight container 133b is denoted as the distance $d_3$. It should be noted that the distance $d_1$ is less than the distance $d_2$ ($d_1<d_2$) (FIG. 10b), and the distance $d_3$ is greater than the distance $d_2$ ($d_3>d_2$) (FIG. 10b). Further, the distance $d_3$ is greater than the distance $d_1$ ($d_3>d_1$).

Hence, in FIGS. 11a and 11b, the weights of the trim weight containers 133a and 133b are not the same so that the crop spraying apparatus 103a is not level. As shown in FIG. 11a, the crop spraying apparatus 103a is not level because the angles theta1 ($\theta_1$) and theta2 ($\theta_2$) are not equal to zero degrees, as in FIG. 10a. In FIG. 11a, the angle theta1 ($\theta_1$) is equal, to negative ten degrees (−10°), and the angle theta2 ($\theta_2$) is equal to positive ten degrees (+10°). In this embodiment, the angle theta1 is negative and the angle theta2 is positive when the crop spraying apparatus 103a is rotated so that the trim weight container 133a moves downwardly and the trim weight container 133b moves upwardly. It should be noted that the angle theta1 can have many different negative values, and the use of negative ten degrees is for illustration purposes only. Further, the angle theta2 can have many different positive values, and the use of positive ten degrees is for illustration purposes only.

FIG. 12a is a rear view of the crop spraying vehicle 100a of FIG. 10a in a second tilted condition, and FIG. 12b is a perspective view of the trim system 145a of FIG. 12a in the second tilted condition. In operation, the pump switch 148 is in the ON2 position so that the pump 136 applies a suction to the port 136a and a pressure to the port 136b. In response, a portion of the fluid 144a flows in a flow direction 125a from the trim weight container 133a to the port 136a through the fluid conduit 135a. The portion of the fluid 144a flows through the pump 136 and to the fluid conduit 135b through the port 136b. The portion of the fluid 144a flows in a flow direction 126b through the fluid conduit 135b to the trim weight container 133b, wherein the portion of the fluid 144a is combined with the fluid 144b, and the crop spraying apparatus 103a rotates in response. The combining of the fluids 144a and 144b is indicated in FIG. 12b, wherein the level of the fluid 144b of the trim weight container 133b is denoted as the distance $d_3$ and the level of the fluid 144a of the trim weight container 133a is denoted as the distance $d_1$. As mentioned above, the distance $d_1$ is less than the distance $d_2$ ($d_1<d_2$) (FIG. 10b), and the distance $d_3$ is greater than the distance $d_2$ ($d_3>d_2$) (FIG. 10b). Further, the distance $d_3$ is greater than the distance $d_1$ ($d_3>d_1$).

Hence, in FIGS. 12a and 12b, the weights of the trim weight containers 133a and 133b are not the same so that the crop spraying apparatus 103a is not level. As shown in FIG. 12a, the crop spraying apparatus 103a is not level because the angles theta1 ($\theta_1$) and theta2 ($\theta_2$) are not equal to zero degrees, as in FIG. 10a. In FIG. 1.2a, the angle theta1 ($\theta_1$) is equal to negative fen degrees (−10°), and the angle theta1 ($\theta_2$) is equal to positive ten degrees (+10°). In this embodiment, the angle theta2 is negative and the angle theta1 is positive when the crop spraying apparatus 103a is rotated so that the trim weight container 133b moves downwardly and the trim weight container 133a moves upwardly, it should be noted that the angle theta2 can have many different negative values, and the use of negative ten degrees is for illustration purposes only. Further, the angle theta1 can have many different positive values, and the use of positive ten degrees is for illustration purposes only.

Figure 13B:
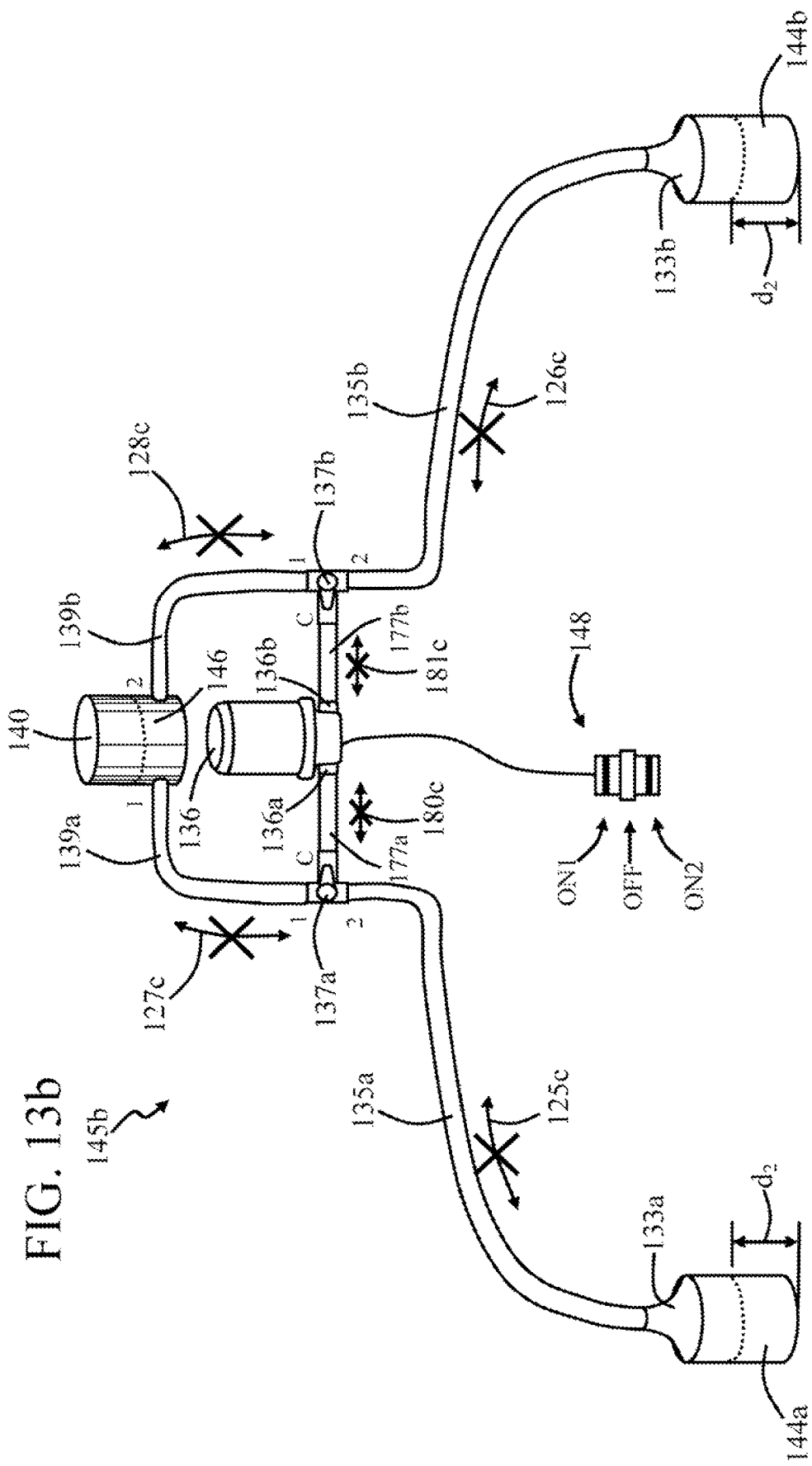

FIG. 13a is a rear view of the crop spraying vehicle 100a of FIG. 6, which includes a trim system 145b, and FIG. 13b is a perspective view of the trim system 145b of FIG. 13a. In this embodiment, the trim system 145b includes the pump 136, which includes the ports 136a and 136b. The pump 136 includes the pump switch 148, which operates as a pump controller to control the operation of the pump 136. In this embodiment, the pump switch 148 is embodied as a three-way switch having three settings. In a first setting, the pump switch 148 is in an OFF position so that the pump 136 is in an off condition. When pump 136 is in the off condition, the ports 136a and 136b do not provide suction, and the ports 136a and 136b do not provide pressure. It should be noted, that the pump switch 148 is shown in the OFF position in FIG. 13b. In a second setting, the pump switch 148 is in the ON1 position, so that the port 136b provides suction and the port 136a provides pressure, as will be discussed below with FIGS. 14a and 14b. In a third setting, the pump switch 148 is in the ON2 position, so that the port 136a provides suction and the port 136b provides pressure, as will be discussed below with FIGS. 15a and 15b. In this way, the pump 136 operates as a bidirectional pump.

In this embodiment, the trim system 145b includes fluid conduits 177a and 177b, wherein one end of fluid conduit 177a is connected to the port 136a and one end of the fluid conduit 177b is connected to the port 136b. The trim system 145b includes valves 137a and 137b, which are embodied as three-way valves. It should be noted that a three-way valve has three positions that can be selected by moving a handle in a well-known manner. The three-way valve includes a common port (denoted as C), which is in fluid communication with a first port (denoted as 1) when the handle is in a first position. The common port is in fluid communication with a second port (denoted as 2) when the handle is in a second position. When the handle is in the third position, the common port is not in fluid communication with the first port, the common port is not in fluid communication with the second port, and the first and second ports are not in fluid communication with each other. In this way, the three-way valve is in an off condition when the handle is in the third position. Valves are provided by many different manufacturers, such as Banjo Corporation of Crawfordsville, Ind., it should be noted that there are many different types of valves that can be used herein, such as a three-way valve that does not have an off condition.

In this embodiment, an opposed end of the fluid conduit 177a is connected to a common port (C) of the valve 137a, and an opposed end of the fluid conduit 177b is connected to a common port (C) of the valve 137b. The trim system 145b includes fluid conduits 139a and 139b, wherein one end of the fluid conduit 139a is connected to a first port (1) of the valve 137a and one end of the fluid conduit 139b is connected to a first port (1) of the valve 137b.

In this embodiment, the trim system 145b includes a fluid reservoir 140, which includes a fluid 146. The fluid 146 is typically the same type of fluid as the fluids 144a and 144b, such as water. The fluid reservoir 140 includes a first port (1) connected to an opposed end of the fluid conduit 139a and a second port (2) connected to an opposed end of the fluid conduit 139b. It should be noted that, in the embodiments of FIGS. 13a, 13b, 14a, 14b, 15a, and 15b, the trim system 145b includes a single fluid reservoir. However, in other embodiments, the fluid system can include more than one fluid reservoir.

In this embodiment, the trim system 145b includes the fluid conduits 135a and 135b, wherein one end of the fluid conduit 135a is connected to a second port (2) of the valve 137a and one end of the fluid conduit 135b is connected to a second port (2) of the valve 137b. The trim system 145b includes the trim weight containers 133a and 133b, wherein the fluid conduits 135a and 135b are connected to the fluid weight containers 133a and 133b, respectively, as discussed in more detail above.

In this embodiment, the trim weight container 133a includes the fluid 144a, and the trim weight container 133b includes the fluid 144b. In FIG. 13b, the level, of the fluid 144a of the trim weight container 133a is denoted as the distance $d_2$. Further, the level of the fluid 144b of the trim weight container 133b is denoted as the distance $d_2$. Hence, in FIG. 13b, the weights of the trim weight containers 133a and 133b are substantially the same so that the crop spraying apparatus 103a is level.

As shown in FIG. 13a, the crop spraying apparatus 103a is level because the angle theta1 ($\theta_1$) of the boom 105a is equal to zero degrees (0°), and the angle theta2 ($\theta_2$) of the boom 105b is equal to zero degrees (0°). As mentioned above, the angles theta1 and theta2 are equal to zero degrees when the crop spraying apparatus 103a is level. The crop spraying apparatus 103a is level, when it is horizontal. It should be noted that, in some situations, the distance $d_2$ is driven to zero so that the trim weight containers 133a and 133b include substantially no fluid.

In the situation of FIGS. 13a and 13b, the pump switch 148 is in the OFF position so that the pump 136 is in the off condition. Further, the handle of the valve 137a and is in the third position so there is a restricted flow 180c of the fluid through the fluid conduit 177a. The handle of the valve 137b is in the third position so there is a restricted flow 181c of the fluid through the fluid conduit 177b. In this way, the fluids 146, 144a and 144b are restricted from flowing through the ports 136a and 136b of the pump 136.

The handle of the valve 137a and is in the third position so there is a restricted flow 127c of the fluid through, the fluid conduit 139a. The handle of the valve 137b is in the third position so there is a restricted flow 128c of the fluid through the fluid conduit 139b. In this way, the fluids 144a and 144b are restricted from flowing through the first and second ports of the fluid reservoir 140. Further, the fluid 146 is restricted from flowing to the trim weight containers 133a and 133b.

The handle of the valve 137a is in the third position so that there is a restricted flow 125c of the fluid through the fluid conduit 135a. The handle of the valve 137b is in a third position so that there is a restricted flow 126c of the fluid through the fluid conduit 135b. In this way, the fluid 144a is restricted front moving from the trim weight container 133*a* and the fluid 144*b* is restricted from moving from the trim weight container 133*b*. Further, the fluid 146 is restricted from flowing to the trim weight containers 133*a* and 133*b*. It should be noted that the fluids 144*a* and 144*b* can be moved between the trim weight containers 133*a* and 133*b* and the fluid reservoir 140 through the fluid conduits of FIG. 13*b*, as will be discussed in more detail presently.

Figure 14B:
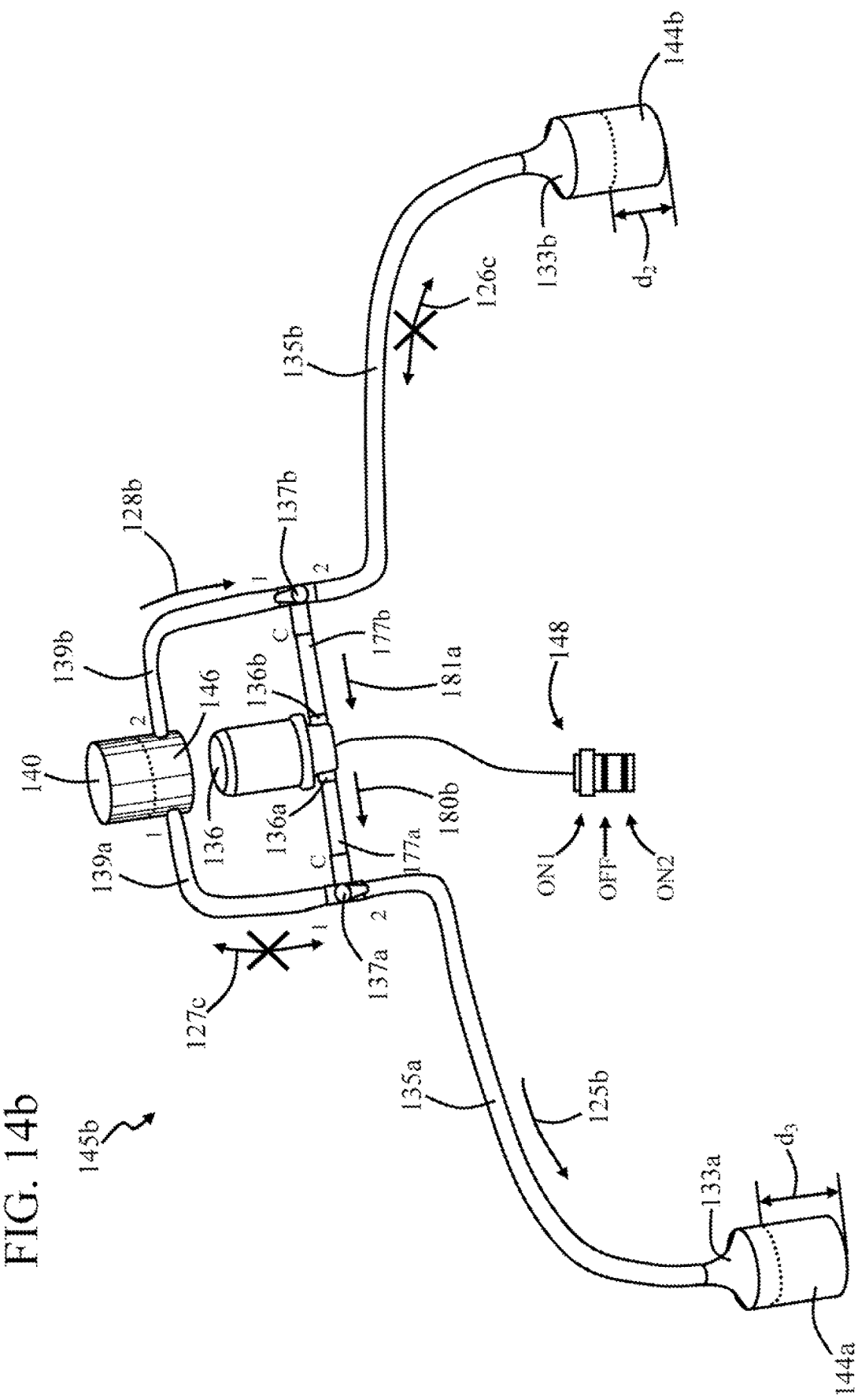
FIG. 14b is a perspective view of the second trim system of FIG. 14a in the first tilted condition.

FIG. 14*a* is a rear view of the crop spraying vehicle 100*a* of FIG. 13*a* in the first tilted condition, and FIG. 14*b* is a perspective view of the trim system 145*b* of FIG. 14*a* in the first tilted condition. In operation, the pump switch 148 is in the ON1 position so that the pump 136 applies suction to the port 136*b* and pressure to the port 136*a*. Further, the handle of the valve 137*a* is in the second position so that the common port (C) is not in fluid communication with the first port (1), and the common port (C) is in fluid communication with the second port (2). Hence, there is a restricted flow 127*c* of the fluid through the fluid conduit 139*a*. The handle of the valve 137*b* is in the first position so that the common port (C) is in fluid communication with the first port (1), and the common post (C) is not in fluid communication with the second port (2). Hence, there is a restricted flow 126*c* of the fluid through the fluid conduit 135*b*. In this way, the fluid 144*b* is restricted from moving from the trim weight container 133*b*, and the fluids 144*a* and 146 are restricted from moving to the trim weight container 133*b*.

In response to the pump switch 148 being in the ON1 position, a portion of the fluid 146 of the fluid reservoir 140 flow's in a flow direction 128*b* from the second port (2) of the fluid reservoir 140 to the first port (1) of the valve 137*b*. The portion of the fluid 146 flows through the fluid conduit 177*b* in a flow direction 181*a* from the common port (C) of the valve 137*b* to the port 136*b* of the pump 136. The portion of the fluid 146 flows through the fluid conduit 177*a* in a flow direction 180*b* from the port 136*a* of the pump 136 to the common port (C) of the valve 137*a*. The portion of the fluid 146 flows in the flow direction 125*b* through the second port (2) of the valve 137*a* and to the trim weight container 133*a* through the fluid conduit 135*a*, wherein the portion of the fluid 146 is combined with the fluid 144*a*. This is indicated in FIG. 14*b*, wherein the level of the fluid 144*a* of the trim weight container 133*a* increases from distance d$_2$ (FIG. 13*b*) to distance d$_3$. The distances d$_2$ and d$_3$ are discussed in more detail above.

Hence, in FIGS. 14*a* and 14*b*, the weights of the trim weight containers 133*a* and 133*b* are not the same so that the crop spraying apparatus 103*a* is not level. As shown in FIG. 14*a*, the crop spraying apparatus 103*a* is not level because the angles theta1 ($\theta_1$) and theta2 ($\theta_2$) are not equal to zero degrees, as in FIG. 13*a*. In FIG. 14*a*, the angle theta1 ($\theta_1$) is equal to negative ten degrees (−10°), and the angle theta2 ($\theta_2$) is equal to positive ten degrees (+10°). In this embodiment, the angle theta1 is negative and the angle theta2 is positive when the crop spraying apparatus 103*a* is rotated so that the trim weight container 133*a* moves downwardly and the trim weight container 133*b* moves upwardly. It should be noted that the angle theta1 can have many different negative values, and the use of negative ten degrees is for illustration purposes only. Further, the angle theta2 can have many different positive values, and the use of positive ten degrees is for illustration, purposes only.

Figure 15A:
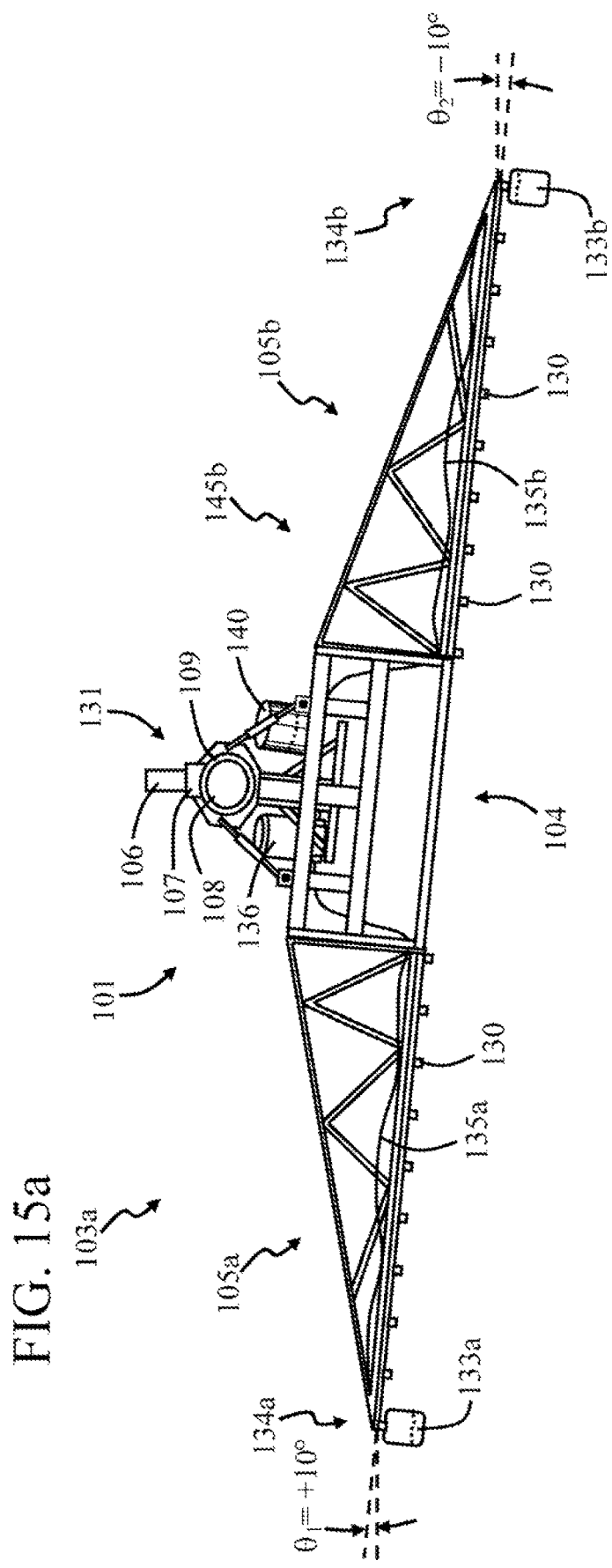
FIG. 15a is a rear view of the crop spraying apparatus of FIG. 13a in the second tilted condition.
Figure 15B:
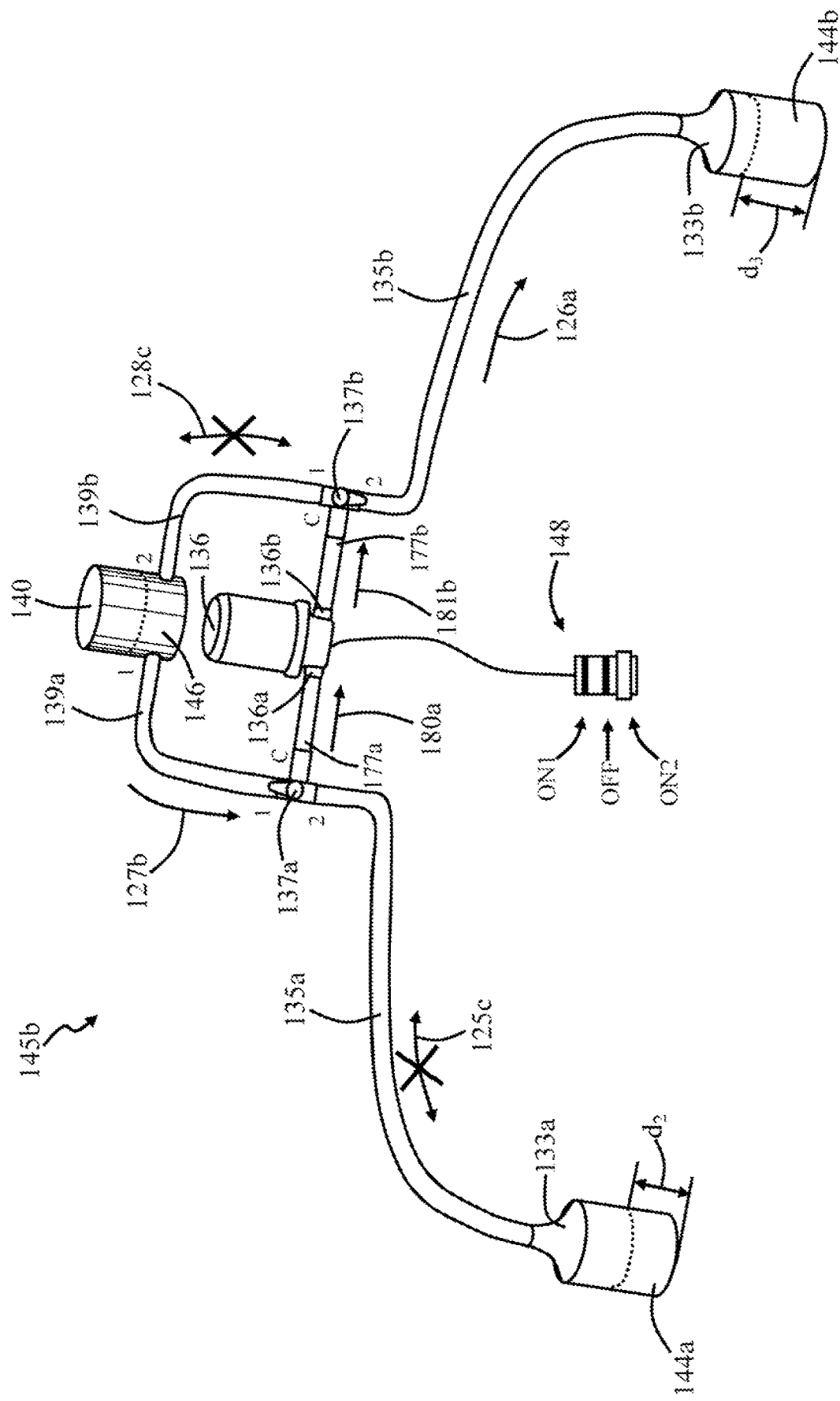
FIG. 15b is a perspective view of the second trim system of FIG. 15a in the second tilted condition.

FIG. 15*a* is a rear view of the crop spraying vehicle 100*a* of FIG. 13*a* in the second tilted condition, and FIG. 15*b* is a perspective view of the trim system 145*b* of FIG. 15*a* in the second tilted condition. In operation, the pump switch 148 is in the ON2 position so that the pump 136 applies suction, to the port 136*a* and pressure to the port 136*b*. Further, the handle of the valve 137*b* is in the second position so that the common port (C) is not in fluid communication with the first port (1), and the common port (C) is in fluid communication with the second port (2). Hence, there is a restricted flow 128*c* of the fluid through the fluid conduit 139*b*. The handle of the valve 137*a* is in the first position so that the common port (C) is in fluid communication with the first port (1), and the common port (C) is not in fluid communication with the second port (2). Hence, there is a restricted flow 125*c* of the fluid through the fluid conduit 135*a*. In this way, the fluid 144*a* is restricted from moving from the trim weight container 133*a*, and the fluids 144*b* and 146 are restricted from moving to the trim weight container 133*a*.

In response to the pump switch 148 being in the ON2 position, a portion of the fluid 146 of the fluid reservoir 140 flows in a flow direction 127*b* from the first port (1) of the fluid reservoir 140 to the first port (1) of the valve 137*a*. The portion of the fluid 146 flows through the fluid conduit 177*a* in a flow direction 180*a* from the common port (C) of valve 137*a* to the port 136*a* of the pump 136. The portion of the fluid 146 flows through the fluid conduit 177*b* in a flow direction 180*b* from the port 136*b* of the pump 136 to the common port (C) of the valve 137*b*. The portion of the fluid 146 flows in the flow direction 126*a* through the second port (2) of the valve 137*b* and to the trim weight container 133*b* through the fluid conduit 135*b*, wherein the portion of the fluid 146 is combined with the fluid 144*b*. This is indicated in FIG. 15*b*, wherein the level of the fluid 144*b* of the trim weight container 133*b* increases from distance d$_2$ (FIG. 14*b*) to distance d$_3$. The distances d$_2$ and d$_3$ are discussed in more detail above.

Hence, in FIGS. 15*a* and 15*b*, the weights of the trim weight containers 133*a* and 133*b* are not the same so that the crop spraying apparatus 103*a* is not level. As shown in FIG. 15*a*, the crop spraying apparatus 103*a* is not level, because the angles theta1 ($\theta_1$) and theta2 ($\theta_2$) are not equal to zero degrees, as in FIG. 13*a*. In FIG. 15*a*, the angle theta1 ($\theta_1$) is equal to positive ten degrees (−10°), and the angle theta2 ($\theta_2$) is equal to negative ten degrees (−10°). In this embodiment, the angle theta1 is positive and the angle theta2 is negative when the crop spraying apparatus 103*a* is rotated so that the trim weight container 133*a* moves upwardly and the trim weight container 133*b* moves downwardly. It should be noted that the angle theta1 can have many different positive values, and the use of positive ten degrees is for illustration purposes only. Further, the angle theta2 can have many different negative values, and the use of negative ten degrees is for illustration purposes only.

The trim system 145*b* is useful because fluid can be moved to the trim weight container 133*a* from the fluid reservoir 140 without removing fluid 144*b* from the trim weight, container 133*b*. Further, fluid can be moved to the trim weight container 133*b* from the fluid reservoir 140 without removing fluid 144*a* from the trim weight container 133*a*.

It should be noted that, in some situations, the distance d$_2$ is driven to zero so that the trim weight containers 133*a* and 133*b* include substantially no fluid. In this situation, the trim system 145*b* can be operated so that a portion of the fluid 146 is moved to the trim weight container 133*a* to become fluid 144*a*, and another portion of the fluid 146 is moved to the trim weight container 133*b* to become fluid 114*b*.

Figure 16B:
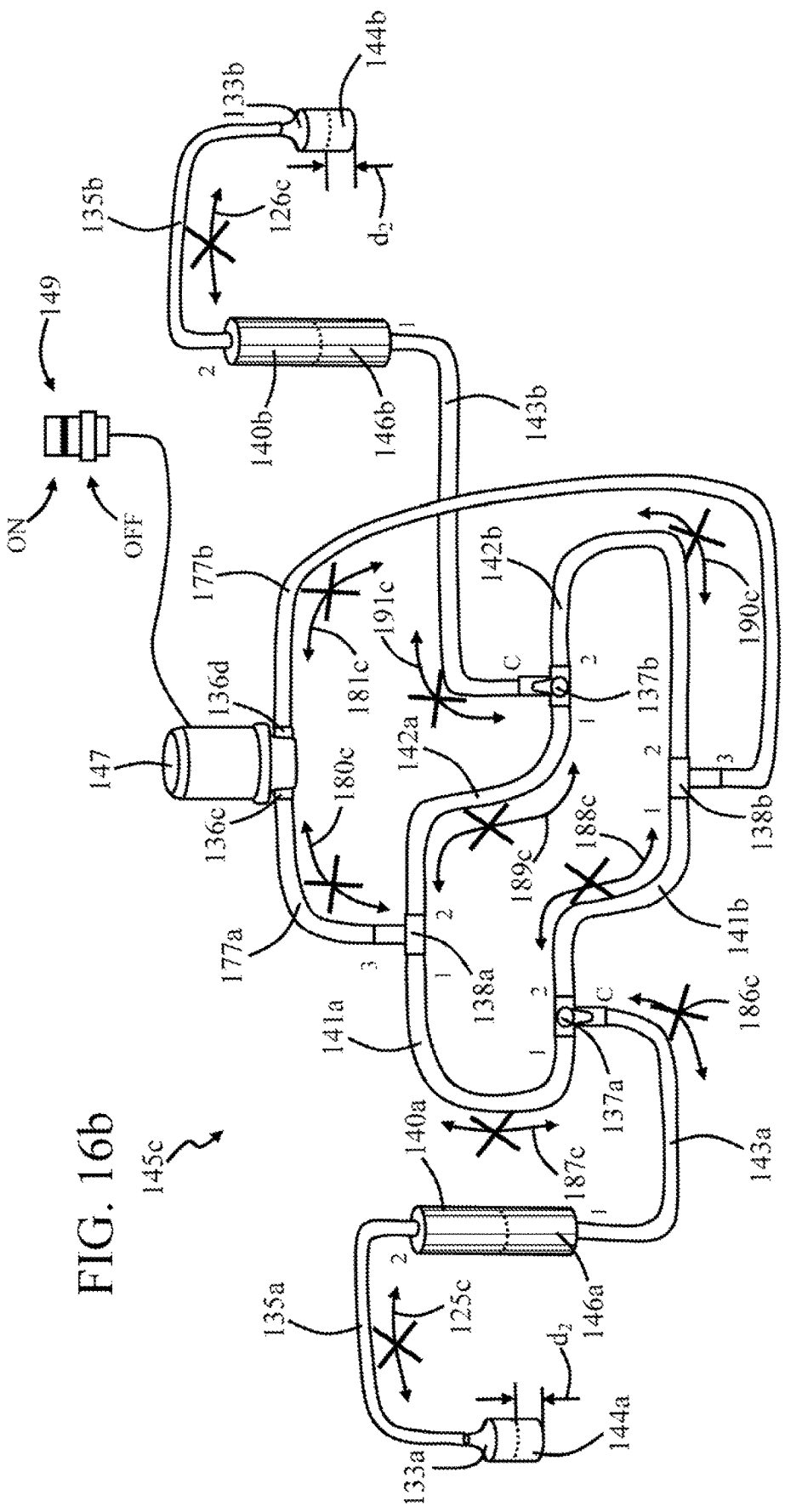

FIG. 16*a* is a rear view of the crop spraying vehicle 100*a* of FIG. 6, which includes a trim system 145*c*, and FIG. 16*b* is a perspective view of the trim system 145*c* of FIG. 16*a*.

In this embodiment, the trim system 145*b* includes a pump 147, which includes an input port 136*c* and output port 136*d*. The pump 147 includes a pump switch 149, which operates as a pump controller to control the operation of the pump 147. In this embodiment, the pump switch 149 is embodied as a two-way switch having two settings. In a first setting, the pump switch 149 is in an OFF position so that the pump 147 is in an off condition. When pump 147 is in the off condition, the input port 136*c* and output port 136*d* do not provide suction, and the input port 136*c* and output port 136*d* do not provide pressure. It should be noted that the pump switch 149 is shown in the OFF position in FIG. 16*b*. In a second setting, the pump switch 149 is in the ON position, so that the input port 136*c* provides suction and the output port 136*d* provides pressure, as will be discussed below with FIGS. 17*a*, 17*b*, 18*a* and 18*b*. In this way, the pump 147 operates as a unidirectional pump.

In this embodiment, the trim system 145*b* includes fluid conduits 177*a* and 177*b*, wherein one end of fluid conduit 177*a* is connected to the input port 136*c* and one end of the fluid conduit 177*b* is connected to the output port 136*d*. The trim system 145*c* includes a connector 138*a*, wherein the opposed end of the fluid conduit 177*a* is connected to a third port (3) of the connector 138*a*. The trim system 145*c* includes a connector 138*b*, wherein the opposed end of the fluid conduit 177*b* is connected to a third port (3) of the connector 138*b*.

The trim system 145*c* includes valves 137*a* and 137*b*, which are embodied as three-way valves. As discussed above, a three-way valve has three positions that can be selected by moving a handle in a well-known manner. The three-way valve includes a common port (C), which is in fluid communication with a first port (1) when the handle is in a first position. The common port (C) is in fluid communication with a second port (2) when the handle is in a second position. When the handle is in the third position, the common port (C) is not in fluid communication with the first port (1), the common port (C) is not in fluid communication with the second port (2), and the first and second ports are not in fluid communication with each other. In this way, the three-way valve is in an off condition when the handle is in the third position.

In this embodiment, the first port (1) of the valve 137*a* is connected to the first port (1) of the connector 138*a* through a fluid conduit 141*a*. The second port (2) of the valve 137*a* is connected to the first port (1) of the connector 138*b* through a fluid conduit 141*b*. The common port (C) of the valve 137*a* is connected to a first port (1) of a fluid reservoir 140*a* through a fluid conduit 143*a*. A second port (2) of the fluid reservoir 140*a* is connected to the trim weight container 133*a* through the fluid conduit 135*a*. The trim weight container 133*a* includes the fluid 144*a*, and the fluid reservoir 140*a* includes the fluid 146*a*. It should be noted that, in the embodiments of FIGS. 16*a*, 16*b*, 17*a*, 17*b*, 18*a*, and 18*b*, the trim system 145*b* includes a pair of fluid reservoirs. However, in other embodiments, the fluid system can include more than two fluid reservoirs.

The second port (2) of the connector 138*a* is connected to the first port (1) of the valve 137*b* through a fluid conduit 142*a*. The second port (2) of the valve 137*b* is connected to the second port (2) of the connector 138*b* through a fluid conduit 142*b*. The common port (C) of the valve 137*b* is connected to a first port (1) of a fluid reservoir through a fluid conduit 143*b*. A second port (2) of the fluid reservoir 140*b* is connected to the trim weight container 133*b* through the fluid conduit 135*b*. The trim weight container 133*b* includes the fluid 144*b*, and the fluid reservoir 140*b* includes the fluid 146*b*. It should be noted that the fluids 146*a* and 146*b* are typically the same type of fluids as the fluids 144*a* and 144*b*, such as water.

In FIG. 16*b*, the level of the fluid 144*a* of the trim weight container 133*a* is denoted as the distance $d_2$. Further, the level of the fluid 144*b* of the trim weight container 133*b* is denoted as the distance $d_2$. Hence, in FIG. 16*b*, the weights of the trim weight containers 133*a* and 133*b* are substantially the same so that the crop spraying apparatus 103*a* is level.

As shown in FIG. 16*a*, the crop spraying apparatus 103*a* is level because the angle theta1 ($\theta_1$) of the boom 105*a* is equal, to zero degrees (0°), and the angle theta2 of the boom 105*b* is equal to zero degrees (0°). As mentioned above, the angles theta1 and theta2 are equal to zero degrees when the crop spraying apparatus 103*a* is level. The crop spraying apparatus 103*a* is level when it is horizontal. It should be noted that, in some situations, the distance $d_2$ is driven to zero so that the trim weight containers 133*a* and 133*b* include substantially no fluid.

In the situation of FIGS. 16*a* and 16*b*, the pump switch 149 is in the OFF position so that the pump 147 is in the off condition. Further, the handle of the valve 137*a* is in the third position so that there is a restricted flow 125*c* of the fluid through the fluid conduit 135*a*. Further, the handle of the valve 137*b* is in the third position so that there is a restricted flow 126*c* of the fluid through the fluid conduit 135*b*. In this way, the fluid 144*a* is restricted from moving from the trim weight container 133*a* and the fluid 144*b* is restricted from moving from the trim weight container 133*b*.

In this embodiment, the handle of the valve 137*a* is in the third position so that there is a restricted flow 186*c* of the fluid through, the fluid conduit 143*a*. Further, the handle of the valve 137*b* is in the third position so that there is a restricted flow 191*c* of the fluid through the fluid conduit 143*b*. Hence, the fluid 144*a* is restricted from moving from the trim weight container 133*a* to the fluid reservoir 140*a*, and the fluid 144*b* is restricted from moving from the trim weight container 133*b* to the fluid reservoir 140*b*. Further, the fluid 146*a* is restricted from moving from the fluid reservoir 140*a*, and the fluid 146*b* is restricted from moving from the fluid reservoir 140*b*. In particular, the fluid 146*a* is restricted from moving from the fluid reservoir 140*a* to the trim weight container 133*a*, and the fluid 146*b* is restricted from moving from the fluid reservoir 140*b* to the trim weight container 133*b*. The fluid 146*a* is restricted from moving from the fluid reservoir 140*a* to the fluid reservoir 140*b*, and the fluid 146*b* is restricted from moving from the fluid reservoir 140*b* to the fluid reservoir 140*a*.

In this embodiment, the handle of the valve 137*a* is in the third position so that there is the restricted flow 180*c* of the fluid through the fluid conduit 177*a*. Further, there is a restricted flow 187*c* of fluid through the fluid conduit 141*a*, and a restricted flow 188*c* of fluid through the fluid conduit 141*b*. In this embodiment, the handle of the valve 137*b* is in the third position so there is a restricted flow 181*c* of the fluid through the fluid conduit 177*b*. Further, there is a restricted flow 189*c* of fluid through the fluid conduit 142*a*, and a restricted flow 190*c* of fluid through the fluid conduit 142*b*. In this way, the fluids 144*a*, 144*b*, 146*a* and 146*b* are restricted from flowing through the input port 136*c* and output port 136*d* of the pump 147. It should be noted that the fluids 144*a* and 144*b* can be moved between the trim weight containers 133*a* and 133*b* and the fluid reservoirs 140*a* and 140*b* through the fluid conduits of FIG. 16*b*, as will be discussed in more detail presently.

Figure 17B:
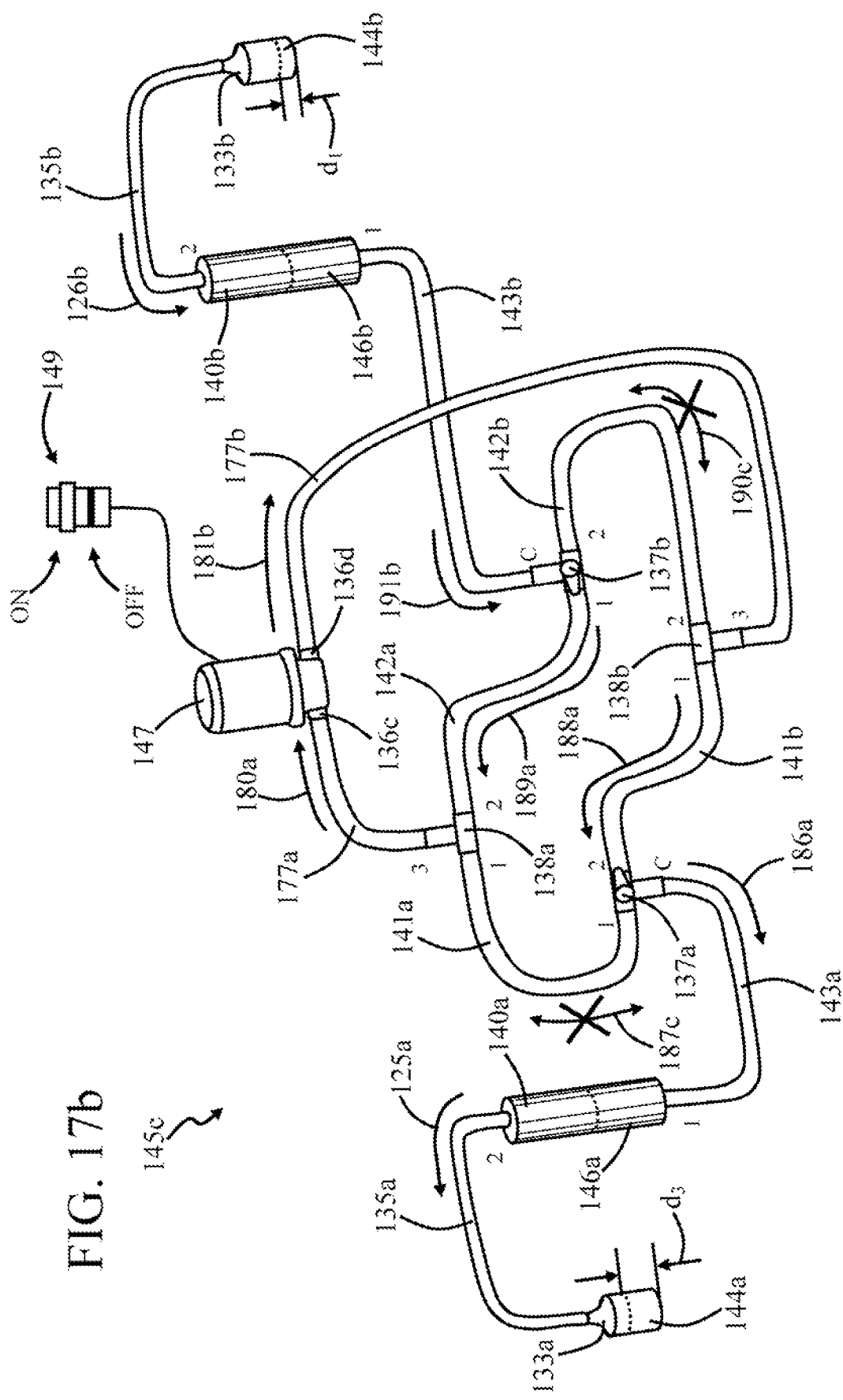
FIG. 17b is a perspective view of the third trim system of FIG. 17a in the first tilted condition.

FIG. 17a is a rear view of the crop spraying vehicle 100a of FIG. 16a in the first tilted condition, and FIG. 17b is a perspective view of the trim system 145c of FIG. 17a in the first tilted condition. In operation, the pump switch 149 is in the ON position so that the pump 147 applies suction to the input port 136c and pressure to the output port 136d. Further, the handle of the valve 137a is in the second position so that the common port (C) is not in fluid communication with the first port (1), and the common port (C) is in fluid communication with the second port (2). Hence, there is the restricted flow 187c of the fluid through the fluid conduit 141a, and the fluid flows in a flow direction 188a through the fluid conduit 141b.

The handle of the valve 137b is in the first position so that the common port (C) is in fluid communication with the first port (1), and the common port (C) is not in fluid communication with the second port (2). Hence, there is the restricted flow 190c of the fluid through the fluid conduit 142b, and there is a fluid flow 189a through the fluid conduit 142a.

In this situation, a portion of the fluid 144b of the trim weight container 133b flows in the flow direction 126b through the fluid conduit 135b to the second port (2) of the fluid reservoir 140b, wherein it is combined with the fluid 146b. A portion of the fluid of the fluid reservoir 140b flows in a flow direction 191b through the first port (1) of the fluid reservoir 140a to the common port (C) of the valve 137b through the fluid conduit 143b. The fluid flows in the flow direction 189a through the first port (1) of the valve 137b to the second port (2) of the connector 138b through the fluid conduit 142a. The fluid flows in a flow direction 180a through the third port (3) of the connector 138a to the input port 136c of the pump 147. The fluid flows in a flow direction 181b through the output port 136d of the pump 147 to the third (3) port of the connector 138b through the fluid conduit 177b. The fluid flows in the flow direction 188a through the first port (1) of the connector 138b to the second port (2) of the valve 137a through the fluid conduit 141b. The fluid flows in the flow direction 186a through the common port (C) of the valve 137a to the first port (1) of the fluid reservoir 140a through the fluid conduit 143a, wherein the fluid is combined with the fluid 146a. A portion of the fluid of the fluid reservoir 140a flows in a flow direction 125a through the second port (2) of the fluid reservoir 140a to the trim weight container 133a through the fluid conduit 135a, wherein it is combined with the fluid 144a.

This is indicated in FIG. 17b, wherein the level of the fluid 144a of the trim weight container 133a is denoted as the distance $d_3$ and the level of the fluid 144b of the trim weight container 133b is denoted as the distance $d_1$. As discussed above, the distance $d_1$ is less than the distance $d_2$ ($d_1 < d_2$) (FIG. 17b), and the distance $d_3$ is greater than the distance $d_2$ ($d_3 > d_2$) (FIG. 16b). Further, the distance $d_3$ is greater than the distance $d_1$ ($d_3 > d_1$).

Hence, in FIGS. 17a and 17b, the weights of the trim weight containers 133a and 133b are not the same so that the crop spraying apparatus 103a is not level. As shown in FIG. 17a, the crop spraying apparatus 103a is not level because the angles theta1 ($\theta_1$) and theta2 ($\theta_2$) are not equal to zero degrees, as in FIG. 16a. In FIG. 17a, the angle theta1 ($\theta_1$) is equal to negative ten degrees (−10°), and the angle theta2 ($\theta_2$) is equal to positive ten degrees (+10°). In this embodiment, the angle theta1 is negative and the angle theta2 is positive when the crop spraying apparatus 103a is rotated so that the trim weight container 133a moves downwardly and the trim weight container 133b moves upwardly, it should be noted that the angle theta1 can have many different negative values, and the use of negative ten degrees is for illustration purposes only. Further, the angle theta2 can have many different positive values, and the use of positive ten degrees is for illustration purposes only.

Figure 18A:
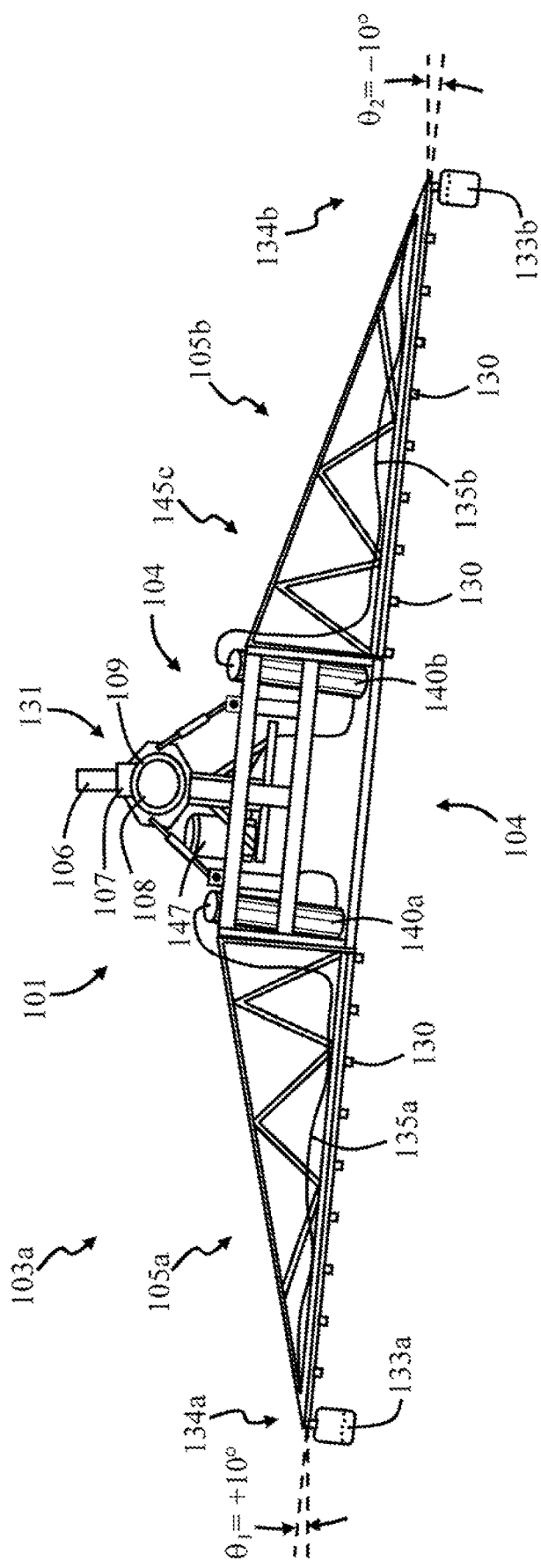
FIG. 18a is a rear view of the crop spraying apparatus of FIG. 16a in the second tilted condition.
Figure 18B:
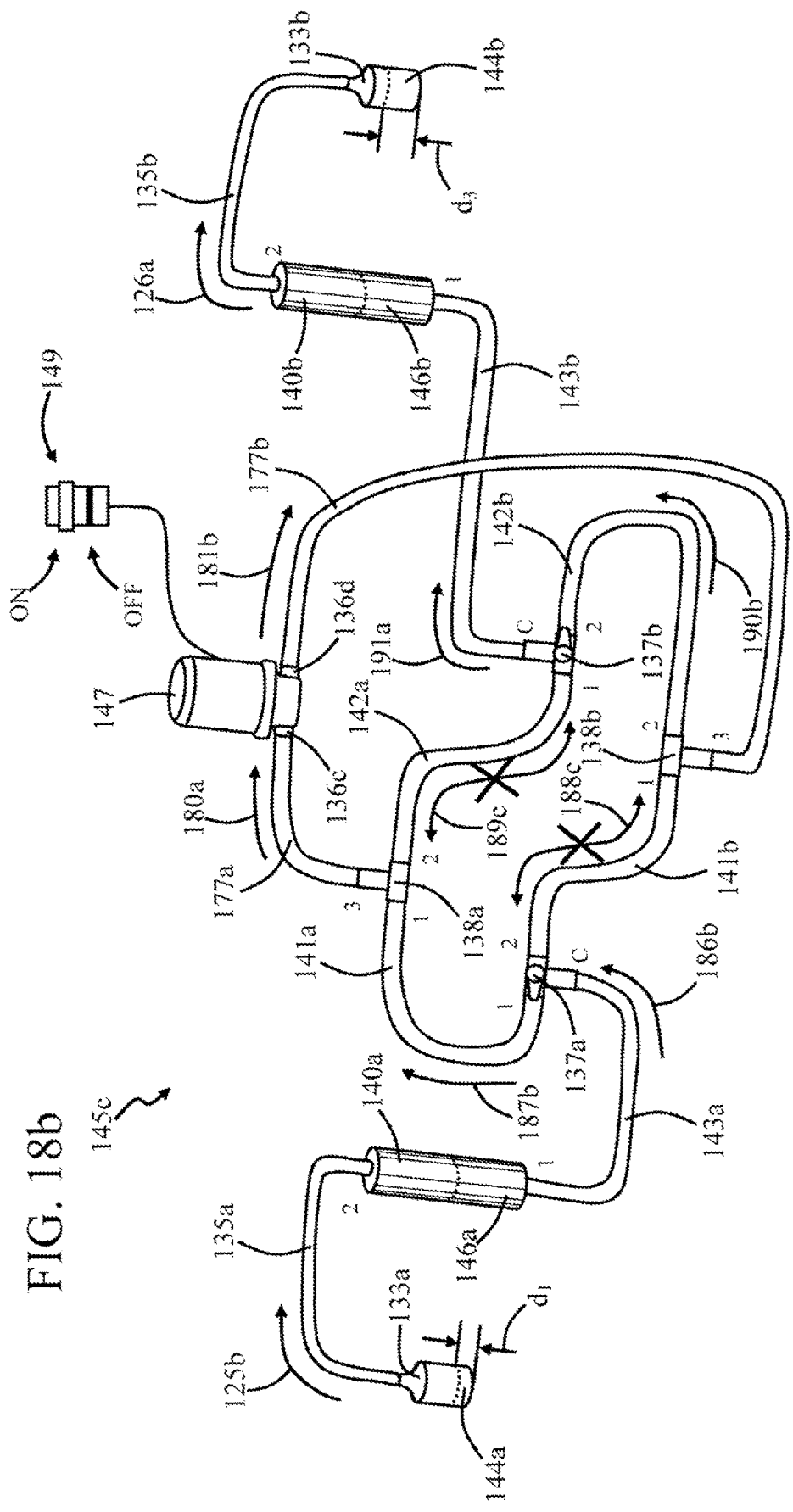
FIG. 18b is a perspective view of the third, trim system of FIG. 18a in the second tilted condition.

FIG. 18b is a rear view of the crop spraying vehicle 100a of FIG. 16a in the second tilted condition, and FIG. 18b is a perspective view of the trim system 145c of FIG. 18a in the second tilted condition. In operation, the pump switch 149 is in the ON position so that the pump 147 applies suction to the input port 136c and pressure to the output port 136d. Further, the handle of the valve 137a is in the first position so that the common port (C) is in fluid communication with the first port (1), and the common port (C) is not in fluid communication with the second port (2). Hence, there is the restricted flow 188c of the fluid through, the fluid conduit 141b, and the fluid flows in a flow direction 187b through the fluid conduit 141a.

The handle of the valve 137b is in the second position so that the common port (C) is not in fluid communication with the first port (2), and the common port (C) is in fluid communication with the second port (2). Hence, there is the restricted flow 189c of the fluid through the fluid conduit 142a, and there is a fluid flow 190b through the fluid conduit 142b.

In this situation, a portion of the fluid 144a of the trim weight container 133a flows in the flow direction 125b through the fluid conduit 135a to the second port (2) of the fluid reservoir 140a, wherein it is combined with the fluid 146a. A portion of the fluid of the fluid reservoir 140a flows in a flow direction 186b through the second port (2) of the fluid reservoir 140a to the common port (C) of the valve 137a through the fluid conduit 143a. The fluid flows in the flow direction 187b through the first port (1) of the valve 137a to the first port (1) of the connector 138a through the fluid conduit 141a. The fluid flows in a flow direction 180a through the third port (3) of the connector 138a to the input port 136c of the pump 147. The fluid flows in a flow direction 181b through the output port 136d of the pump 147 to the third port (3) of the connector 138b through the fluid conduit 177b. The fluid flows in the flow direction 190b through the second port (2) of the connector 138b to the second port (2) of the valve 137b through the fluid conduit 142b. The fluid flows in the flow direction 191a through the common port (C) of the valve 137b to the first port (1) of the fluid reservoir 140b through the fluid conduit 143b, wherein the fluid is combined with the fluid 146b. A portion of the fluid of the fluid reservoir 140b flows in a flow direction 126a through the second port of the fluid reservoir 140b to the trim weight container 133b through the fluid conduit 135b, wherein it is combined with the fluid 144b.

This is indicated in FIG. 18b, wherein the level of the fluid 144b of the trim weight container 133b is denoted as the distance $d_3$ and the level of the fluid 144a of the trim, weight container 133a is denoted as the distance $d_1$. As discussed above, the distance $d_1$ is less than the distance $d_2$ ($d_1 < d_2$) (FIG. 18b), and the distance $d_3$ is greater than the distance $d_2$ ($d_3 > d_2$) (FIG. 16b). Further, the distance $d_3$ is greater than the distance $d_1$ ($d_3 > d_1$).

Hence, in FIGS. 18a and 18b, the weights of the trim weight containers 133a and 133b are not the same so that the crop spraying apparatus 103a is not level. As shown in FIG. 18a, the crop spraying apparatus 103a is not level because the angles theta1 ($\theta_1$) and theta2 ($\theta_2$) are not equal to zero degrees, as in FIG. 17a, in FIG. 18a, the angle theta1 ($\theta_1$) is equal to positive ten degrees (+10°), and the angle theta2 ($\theta_2$) is equal to negative ten degrees (−10°). In this embodiment, the angle theta1 is positive and the angle theta2 is negative when the crop spraying apparatus 103a is rotated so that the trim weight container 133a moves upwardly and the trim weight container 133b moves downwardly. It should be noted that the angle theta1 can have many different positive values, and the use of positive ten degrees is for illustration purposes only. Further, the angle theta2 can have many different negative values, and the use of negative ten degrees is for illustration purposes only.

Figure 19A:
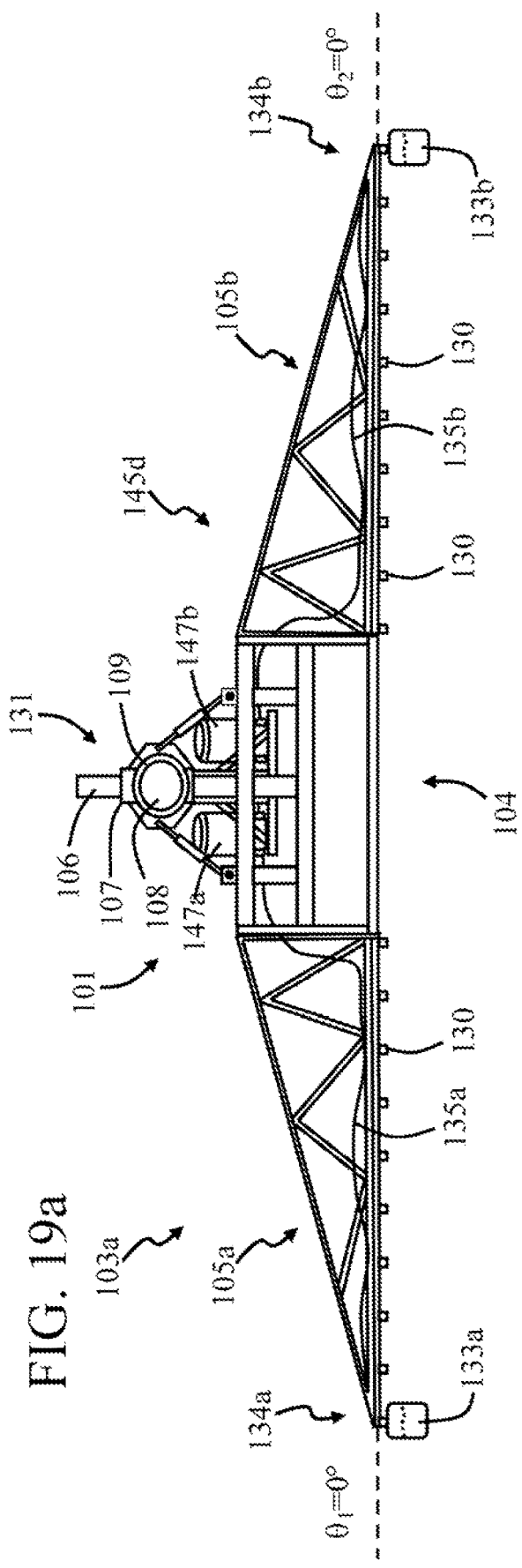
FIG. 19a is a rear view of the crop spraying apparatus of FIG. 6, which includes a fourth trim system.
Figure 19B:
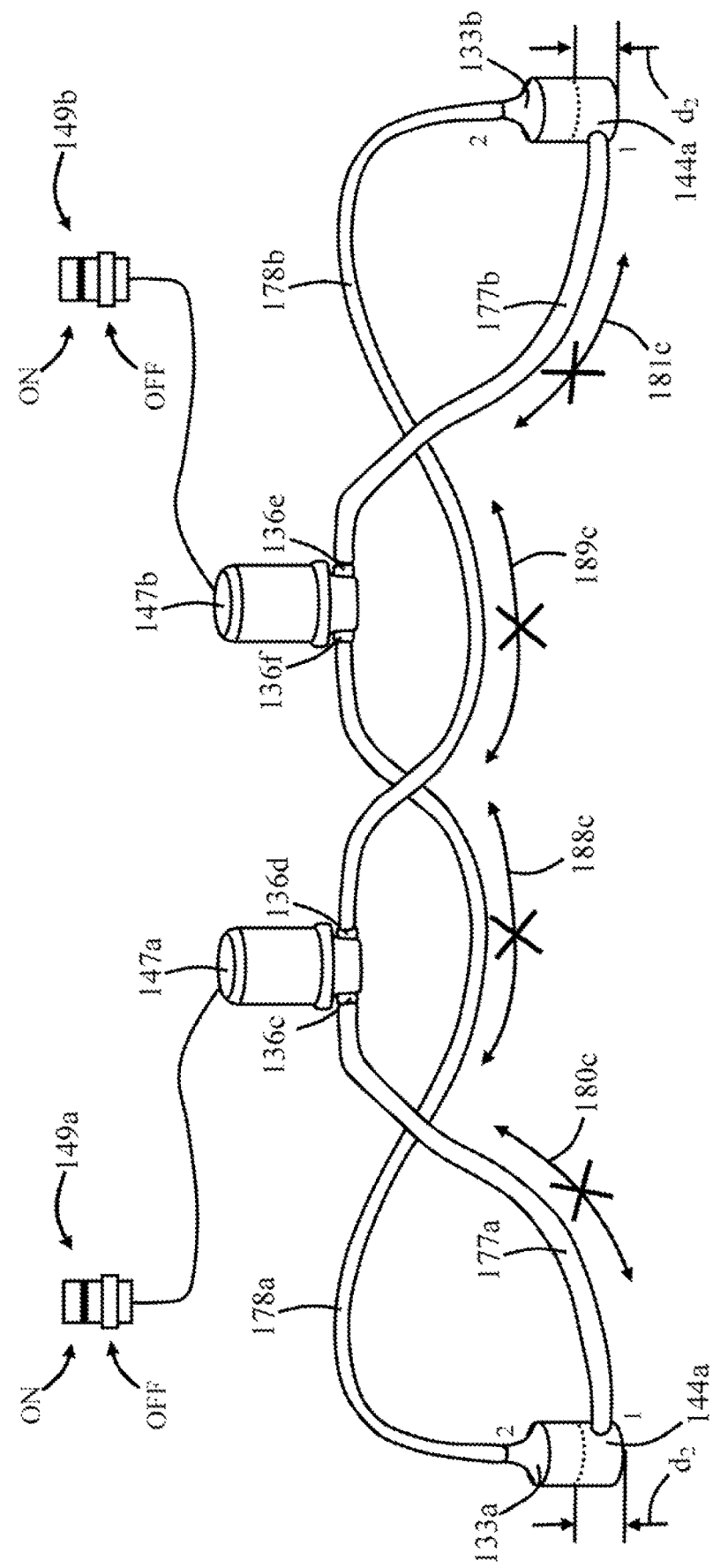

FIG. 19a is a rear view of the crop spraying apparatus 103a of FIG. 6, which includes a trim system 145d, and FIG. 19b is a perspective view of the trim system 145d of FIG. 19a. In this embodiment the trim system 145d includes a pump 147a, which includes an input port 136c and output port 136d. The pump 147a includes a pump switch 149a, which operates as a pump controller to control the operation of the pump 147a. In this embodiment, the pump switch 149a is embodied as a two-way switch having two settings. In a first setting, the pump switch 149a is in an OFF position so that the pump 147a is in an off condition. When pump 147a is in the off condition, the input port 136c and output port 136d do not provide suction, and the input port 136c and output port 136d do not provide pressure. It should, be noted that the pump switch 149a is shown in the OFF position in FIG. 19b. In a second setting, the pump switch 149a is in the ON position, so that the input port 136c provides suction and the output port 136d provides pressure, as will be discussed below with FIGS. 20a, 20b, 21a and 21b. In this way, the pump 147a operates as a unidirectional pump.

In this embodiment, the trim system 145d includes a pump 147b, which includes an input port 136e and output port 136f. The pump 147b includes a pump switch 149b, which operates as a pump controller to control the operation of the pump 147b. In this embodiment, the pump switch 149b is embodied as a two-way switch, having two settings. In a first setting, the pump switch 149b is in an OFF position so that the pump 147b is in an off condition. When pump 147b is in the off condition, the input port 136e and output port 136f do not provide suction, and the input port 136e and output port 136f do not provide pressure. It should be noted that the pump switch 149ba is shown in the OFF position in FIG. 19b. In a second setting, the pump switch 149b is in the ON position, so that the input port 136e provides suction and the output port 136f provides pressure, as will be discussed below with FIGS. 20a, 20b, 21a and 21b. In this way, the pump 147b operates as a unidirectional pump.

In this embodiment, the trim system 145b includes fluid conduits 177a and 177b, wherein one end of fluid conduit 177a is connected to the input port 136c and one end of the fluid conduit 177b is connected to the input port 136e. Further, the trim system 145b includes fluid conduits 178a and 178b, wherein one end of fluid conduit 178a is connected to the output port 136f and one end of the fluid conduit 178b is connected to the output port 136d.

In this embodiment, the trim system 145b includes the trim weight container 133a and 133b. The opposed end of the fluid conduit 177a is connected to a first port of the trim weight container 133a, and the opposed end of the fluid conduit 177b is connected to a first port of the trim weight container 133b. Further, the opposed end of the fluid conduit 178a is connected to a second port of the trim weight container 133a, and the opposed end of the fluid conduit 178b is connected to a second port of the trim weight container 133b.

In this embodiment, the trim weight container 133a includes the fluid 144a, and the trim weight container 133b includes the fluid 144b. In FIG. 19b, the level of the fluid 144a of the trim weight container 133a is denoted as the distance $d_2$. Further, the level of the fluid 144b of the trim weight container 133b is denoted as the distance $d_2$. Hence, in FIG. 19b, the weights of the trim weight containers 133a and 133b are substantially the same so that the crop spraying apparatus 103a is level.

As shown in FIG. 19a, the crop spraying apparatus 103a is level because the angle theta1 ($\theta_1$) of the boom 105a is equal, to zero degrees (0°), and the angle theta2 ($\theta_2$) of the boom 105b is equal to zero degrees (0°). As mentioned above, the angles theta1 and theta2 are equal to zero degrees when the crop spraying apparatus 103a is level. The crop spraying apparatus 103a is level when, it is horizontal. It should be noted that, in some situations, the distance $d_2$ is driven to zero so that the trim weight containers 133a and 133b include substantially no fluid.

In the situation of FIGS. 19a and 19b, the pump switch 149a is in the OFF position so that the pump 147a is in the off condition, and there is the restricted flow 180c through the fluid conduit 177a and the restricted flow 189c through the fluid conduit 178b. Further, the pump switch 149b is in the OFF position so that the pump 147b is in the off condition, and there is the restricted flow 181c through the fluid conduit 177b and the restricted flow 188c through the fluid conduit 178a. In this way, the fluids 144a and 144b are restricted from flowing through the input port 136c and output port 136d of the pump 147a and through the input port 136e and output port 136f of the pump 147b. Further, the fluid 144a is restricted from moving from the trim weight container 133a, and the fluid 144b is restricted from moving the trim weight container 133b. It should be noted that the fluids 144a and 144b can be moved between the trim weight containers 133a and 133b through the fluid conduits of FIG. 19b, as will be discussed in more detail presently.

Figure 20A:
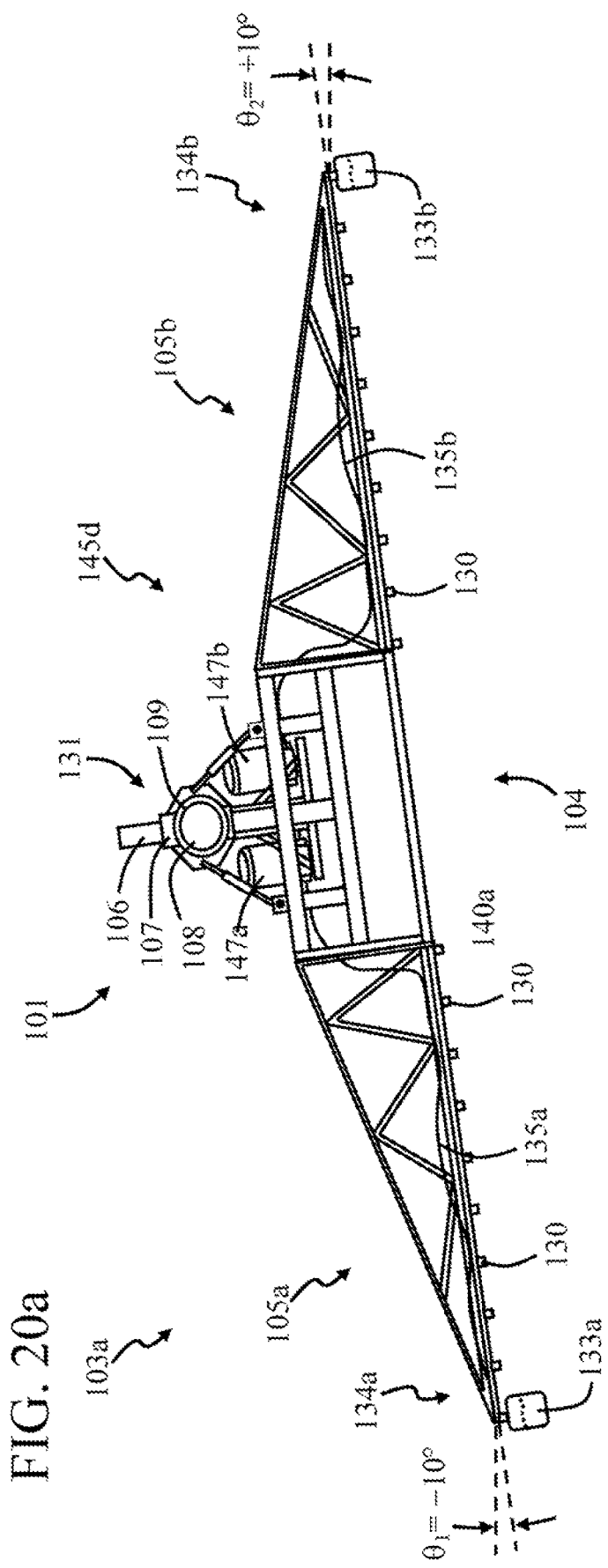
FIG. 20a is a rear view of the crop spraying apparatus of FIG. 19a in the first tilted condition.

FIG. 20a is a rear view of the crop spraying apparatus 103a of FIG. 19a in the first tilted condition, and FIG. 20b is a perspective view of the trim system 145d of FIG. 20a in the first tilted condition. In operation, the pump switch 149b is in the ON position, so the pump 147b is in the on condition. As discussed above, when the pump 147b is in the on condition, it provides suction to the port 136e and pressure to the port 136f. In response, a portion of the fluid 144b flows in a flow direction 181a to the input port 136e. The portion of the fluid 144b flows through the output port 136f in a flow direction 188a through the fluid conduit 178a to the second port of the trim weight container 133a, wherein it is combined with the fluid 144a.

Further, the pump switch 149a is in the OFF position, so the pump 147a is in the off condition. As discussed above, when pump 147a is in the off condition, the input port 136c does not provide suction, and the output port 136d does not provide pressure. Hence, there is the restricted flow 180c through the fluid conduit 177a and there is the restricted flow 189c through the fluid conduit 178b. In this way, the fluid 144a is restricted from flowing through the input port 136c and output port 136d of the pump 147a, and the fluid 144b is allowed to flow to the trim weight container 133a. Further, the fluid 144a is restricted from moving from the trim weight container 133a. This is indicated in FIG. 20b, wherein the level of the fluid 144a of the trim weight container 133a increases from distance $d_2$ (FIG. 19b) to distance $d_3$, and the level of the fluid 144b in the trim weight container 133b decreases from the distance $d_2$ to distance $d_1$. The distances $d_1$, $d_2$ and $d_3$ are discussed in more detail above.

Hence, in FIGS. 20a and 20b, the weights of the trim weight containers 133a and 133b are not the same so that the crop spraying apparatus 103a is not level. As shown in FIG. 20a, the crop spraying apparatus 103a is not level because the angles theta1 ($\theta_1$) and theta2 ($\theta_2$) are not equal to zero degrees, as in FIG. 19a. In FIG. 20a, the angle theta1 ($\theta_1$) is equal to negative ten degrees (−10°), and the angle theta2 ($\theta_2$) is equal to positive ten degrees (+10°). In this embodiment, the angle theta1 is negative and the angle theta2 is positive when the crop spraying apparatus 103a is rotated so that the trim weight container 133a moves downwardly and the trim weight container 133b moves upwardly. It should be noted that the angle theta1 can have many different negative values, and the use of negative ten degrees is for illustration purposes only. Further, the angle theta2 can have many different positive values, and the use of positive ten degrees is for illustration purposes only.

Figure 21A:
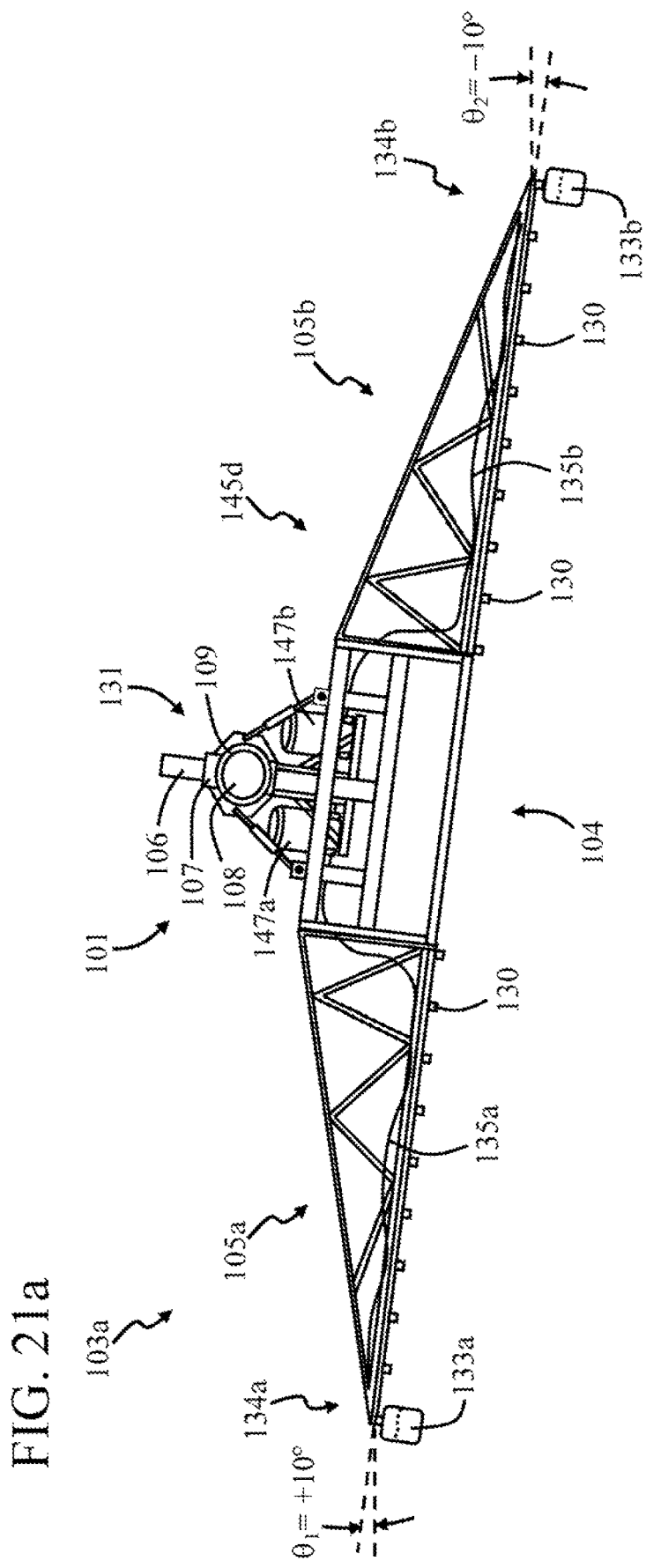
FIG. 21a is a rear view of the crop spraying apparatus of FIG. 19a in the second tilted condition.
Figure 21B:
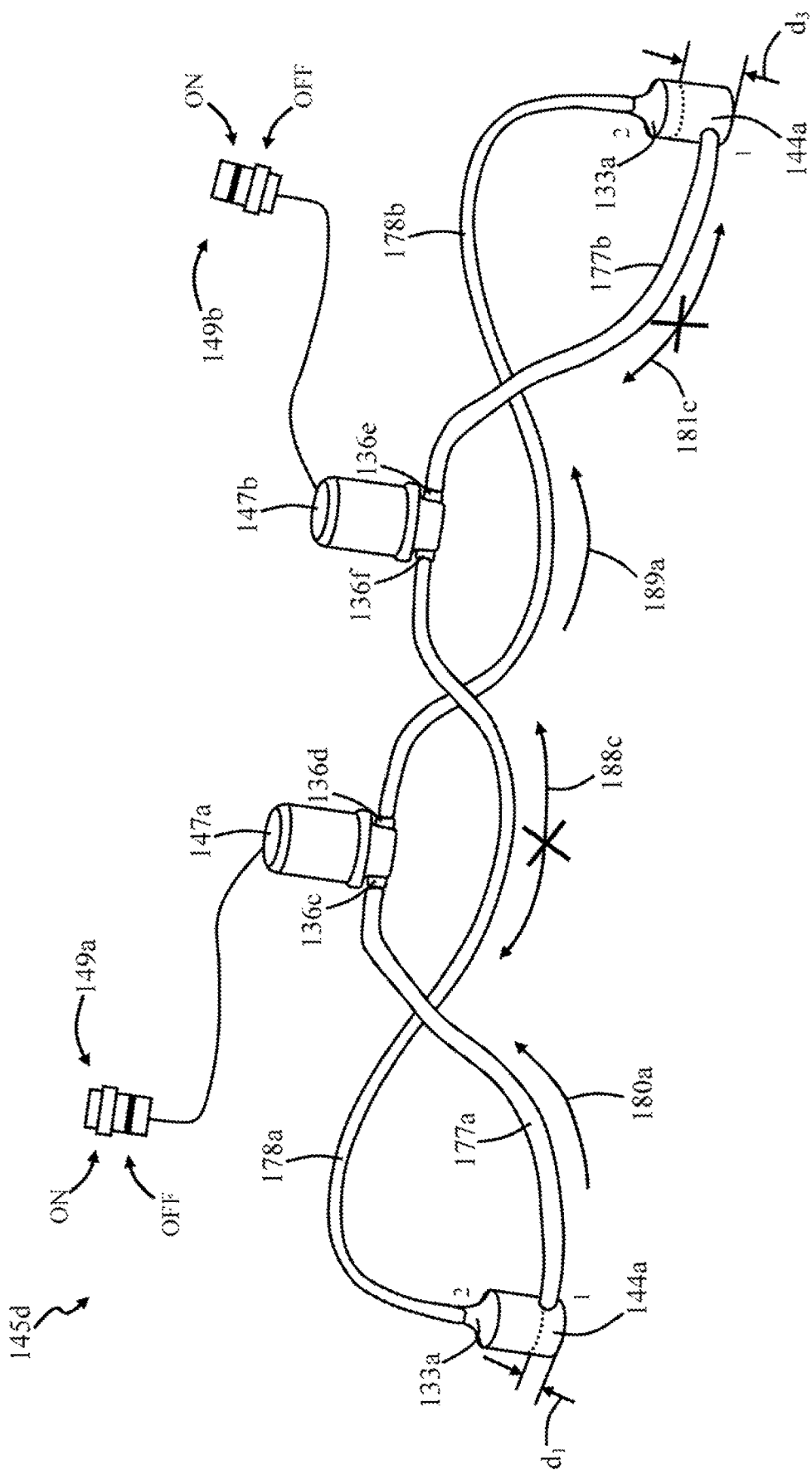
FIG. 21b is a perspective view of the fourth trim system of FIG. 21a in the second tilted condition.

FIG. 21a is a rear view of the crop spraying apparatus 103a of FIG. 19a in the second tilted condition, and FIG. 21b is a perspective view of the trim system 145d of FIG. 21a in the second tilted condition. In operation, the pump switch 149a is in the ON position so the pump 147a is in the on condition. As discussed above, when the pump 147a is in the on condition, it provides suction, to the port 136c and pressure to the port 136d. In response, a portion of the fluid 144a flows in a flow direction 180a to the input port 136c. The portion of the fluid 144b flows through the output port 136d in a flow direction 1889a through the fluid conduit 178b to the second port of the trim weight container 133b, wherein it is combined with the fluid 144b.

Further, the pump switch 149b is in the OFF position, so the pump 147b is in the off condition. As discussed above, when pump 147b is in the off condition, the input port 136e does not provide suction, and the output port 136f does not provide pressure. Hence, there is the restricted flow 181c through the fluid conduit 177b and there is the restricted flow 188c through the fluid conduit 178a. In this way, the fluid 144b is restricted from flowing through the input port 136e and output port 136f of the pump 147b, and the fluid 144a is allowed to flow to the trim weight container 133b. Further, the fluid 144b is restricted from moving from the trim weight container 133b. This is indicated in FIG. 21b, wherein the level of the fluid 144b of the trim weight container 133a increases from distance $d_2$ (FIG. 19b) to distance $d_3$, and the level of the fluid 144a in the trim weight container 133b decreases from the distance $d_2$ to distance $d_1$. The distances $d_1$, $d_2$ and $d_3$ are discussed in more detail above.

Hence, in FIGS. 21a and 21b, the weights of the trim weight containers 133a and 133b are not the same so that the crop spraying apparatus 103a is not level. As shown in FIG. 21a, the crop spraying apparatus 103a is not level, because the angles theta1 ($\theta_1$) and theta2 ($\theta_2$) are not equal to zero degrees, as in FIG. 19a. In FIG. 20a, the angle theta1 ($\theta_1$) is equal to positive ten degrees (−10°) and the angle theta2 ($\theta_2$) is equal to negative ten degrees (−10°). In this embodiment, the angle theta1 is positive and the angle theta2 is negative when the crop spraying apparatus 103a is rotated so that the trim weight container 133a moves upwardly and the trim weight container 133b moves downwardly, it should be noted that the angle theta1 can have many different negative values, and the use of positive ten degrees is for illustration purposes only. Further, the angle theta2 can have many different positive values, and the use of negative ten degrees is for illustration purposes only.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A crop spraying assembly, comprising:
a wheeled vehicle; and
a crop spraying apparatus removably and rotatably coupled to the wheeled vehicle, wherein the crop spraying apparatus is rotatable about a longitudinal axis of the wheeled vehicle, the crop spraying apparatus further comprising:
a first outwardly extending boom;
a first trim weight container coupled to the first outwardly extending boom, wherein the weight of the first trim weight container is adjustable, by adding or removing liquid into or out from the first trim weight container, to adjust a longitudinal rotation of the crop spraying apparatus with respect to the wheeled vehicle in response to adjustment of the weight of the first trim weight container;
a pump; and
a fluid conduit coupled between the pump and the first trim weight container, wherein the pump flows a liquid into and out from the first trim weight container, the liquid being repeatably moveable into and out from the first trim weight container through the fluid conduit.

2. A crop spraying assembly, comprising:
a wheeled vehicle; and
a crop spraying apparatus removably and rotatably coupled to the wheeled vehicle, wherein the crop spraying apparatus is rotatable about a longitudinal axis of the wheeled vehicle, the crop spraying apparatus further comprising:
a first outwardly extending boom;
a first trim weight container coupled to the first outwardly extending boom, wherein the weight of the first trim weight container is adjustable, by adding or removing liquid into or out from the first trim weight container, to adjust a longitudinal rotation of the crop spraying apparatus with respect to the wheeled vehicle in response to adjustment of the weight of the first trim weight container;
a second outwardly extending boom;
a second trim weight container coupled to the second outwardly extending boom, wherein the weight of the second trim weight container is adjustable, by adding or removing liquid into or out from the second trim weight container, to adjust the longitudinal rotation of the crop spraying apparatus with respect to the wheeled vehicle in response to adjustment of the weight of the second trim weight container;
a fluid conduit coupled between the first trim weight container and the second trim weight container; and
a pump operationally coupled to the fluid conduit between the first trim weight container and the second trim weight container, wherein the pump flows a liquid between the first trim weight container and the second trim weight container, the liquid being repeatably moveable into and out from the first and second trim weight containers through the fluid conduit.

* * * * *